(12) United States Patent
Onodera et al.

(10) Patent No.: US 8,137,198 B2
(45) Date of Patent: Mar. 20, 2012

(54) GAME SYSTEM, METHOD FOR CONTROLLING GAME SYSTEM, GAME DEVICE THEREFOR, AND PROGRAM THEREFOR

(75) Inventors: Nobuhiro Onodera, Tokyo (JP); Shintaro Osato, Tokyo (JP); Hajime Wakuda, Tokyo (JP); Shinpei Makino, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1031 days.

(21) Appl. No.: 11/994,194

(22) PCT Filed: Jun. 27, 2006

(86) PCT No.: PCT/JP2006/312785
§ 371 (c)(1),
(2), (4) Date: Dec. 28, 2007

(87) PCT Pub. No.: WO2007/000990
PCT Pub. Date: Jan. 4, 2007

(65) Prior Publication Data
US 2009/0209336 A1    Aug. 20, 2009

(30) Foreign Application Priority Data
Jun. 28, 2005  (JP) ................................ 2005-188175

(51) Int. Cl.
G06F 15/16    (2006.01)
A63F 13/12    (2006.01)

(52) U.S. Cl. ............................... 463/42; 463/30; 463/40

(58) Field of Classification Search ................... 463/20, 463/25, 31, 42; 700/91–93
See application file for complete search history.

(56) References Cited

U.S. PATENT DOCUMENTS
6,171,186 B1    1/2001 Kurosawa et al.
(Continued)

FOREIGN PATENT DOCUMENTS
EP    1 319 431 A2    6/2003
(Continued)

OTHER PUBLICATIONS

Bernier, YW, Latency Compensating Methods in Client/Server Protocol Design and Optimization. 2001, Game Developers Conference, pp. 3 and 4, downloaded from http://web.cs.wpi.edu/~claypool/courses/4513-B03/papers/games/bernier.pdf on Mar. 10, 2011.*

*Primary Examiner* — Peter DungBa Vo
*Assistant Examiner* — Nicholas Ditoro
(74) *Attorney, Agent, or Firm* — Sughrue Mion, PLLC

(57) ABSTRACT

A CPU (511) of game device (50) generates bullet trajectory information when a bullet is fired at an opponent character by a player by operating a gun unit (56), and it transmits the bullet trajectory information to an echo server. The CPU (511), upon receiving the bullet trajectory information from the echo server, generates information showing a result of a determination as to whether the bullet has hit the opponent character based on the position information of a player character and the received bullet trajectory information. In a case in which a game device (50) is specified as the echo server, a game information set generated at game device (50) and a game information set received from an opponent game device are sent to opponent game devices (50) in an order in which game information sets are received.

6 Claims, 14 Drawing Sheets

U.S. PATENT DOCUMENTS

| | | | |
|---|---|---|---|
| 6,907,447 B1 * | 6/2005 | Cooperman et al. | 709/203 |
| 7,101,284 B2 * | 9/2006 | Kake et al. | 463/31 |
| 7,803,054 B1 * | 9/2010 | Ogus et al. | 463/31 |
| 2001/0034766 A1 | 10/2001 | Morimoto | |
| 2003/0114225 A1 | 6/2003 | Kimura | |
| 2003/0126035 A1 * | 7/2003 | Kake et al. | 705/26 |
| 2003/0134678 A1 | 7/2003 | Tanaka | |
| 2003/0236111 A1 | 12/2003 | Otani et al. | |
| 2004/0087369 A1 | 5/2004 | Tanaka et al. | |
| 2005/0192098 A1 * | 9/2005 | Guo et al. | 463/42 |
| 2005/0282639 A1 | 12/2005 | Tanaka et al. | |
| 2006/0154713 A1 * | 7/2006 | Sunazuka et al. | 463/6 |
| 2006/0199644 A1 | 9/2006 | Hirota | |
| 2006/0287096 A1 * | 12/2006 | O'Kelley et al. | 463/42 |
| 2007/0032298 A1 | 2/2007 | Labrie | |

FOREIGN PATENT DOCUMENTS

| | | |
|---|---|---|
| EP | 1 640 047 A1 | 3/2006 |
| JP | 09-244984 A | 9/1997 |
| JP | 10-85457 A | 4/1998 |
| JP | 2000-112886 A | 4/2000 |
| JP | 2001-344372 A | 12/2001 |
| JP | 2002-85850 A | 3/2002 |
| JP | 2002-228458 A | 8/2002 |
| JP | 2003-047774 A | 2/2003 |
| JP | 2003-53041 A | 2/2003 |
| JP | 2003-181145 A | 7/2003 |
| JP | 2003-181147 A | 7/2003 |
| JP | 2003-281554 A | 10/2003 |
| JP | 2004-24360 A | 1/2004 |
| JP | 2004-129925 A | 4/2004 |
| JP | 2004-136009 A | 5/2004 |
| JP | 2004-237003 A | 8/2004 |
| JP | 2004-350910 A | 12/2004 |
| JP | 2005-6913 A | 1/2005 |
| WO | 01/57678 A1 | 8/2001 |
| WO | 2004/075091 A1 | 9/2004 |
| WO | 2004/105905 A1 | 12/2004 |

* cited by examiner

| DETECTED EVENT | A | B | C | D |
|---|---|---|---|---|
| A |  | T1 | T4 | T5 |
| B | T1 |  | T6 | T2 |
| C | T4 | T6 |  | T3 |
| D | T5 | T2 | T3 |  |

GAME SYSTEM, METHOD FOR CONTROLLING GAME SYSTEM, GAME DEVICE THEREFOR, AND PROGRAM THEREFOR

TECHNICAL FIELD

The present invention relates to a game system that performs communication via a relay device, and to a method for controlling the game system, to a game device therefor, and to a program therefor.

BACKGROUND ART

There is a game system including plural game devices in which plural players are enabled to play a game by operating plural characters that are set in a virtual space. In such a system, all determinations based on the moves of characters are performed in a particular device (server) separate from the game devices, and an image to be displayed at each game device is updated only when information is received from the particular device, as described in Japanese Patent Application Laid-Open Publication No. 2003-047774 (hereinafter referred to as "JP 2003-047774").

However, in the system disclosed in JP 2003-047774, information (hereinafter referred to as a "game information set") relating to all the operations performed at each game device (i.e., moves of characters) is reflected to a display of each game device after game information sets are gathered and used for various determinations in the particular device. Therefore, a response time from the time a player operated a player character (the player's own character) until an image corresponding to the operation is displayed at a game device of the player is prolonged due to communication delay. Such a game system is not suited for the execution of a game requiring an extremely short response time such as a shooting game in which plural players operate player characters to cause the characters to move and shoot one another. The same generally applies to a center-terminal type game system and to a master-slave type game system.

The response time can be shortened if a system is configured in a way in which game devices, without involving a particular device, directly communicate with one another on an equal basis (i.e., not in a master-slave relationship) to play the game. There are various types of such systems. For example, it may be configured so that, in each game device, a displayed image is updated in response to the operation by the player without receiving a game information set from a particular device. However, in any variation, each game device associated with the execution of the same game cannot avoid communicating individually with all of the remaining game devices, and therefore, the process is more burdensome than the system as disclosed in JP 2003-047774 in which game devices should only communicate with a particular device. This drawback is even more serious in a case in which a large number of game devices participate in the execution of the same game.

Furthermore, communication delays between game devices are usually not the same, and as a result, contradictions in the game progress are likely to arise. For example, in a system in which a game is executed among the first to the fourth game devices, we assume that the first event takes place at the first game device, and the second event takes place at the second game device. Since a time (communication delay time) required for reporting to another device of an event that has happened in one game device depends on the destination game device, a situation may arise in which the third game device learns of the first event and then of the second event, but the fourth game device learns of the first event after learning of the second event. Because a game usually progresses in the order of the events reported at each game device, contradictions are likely to arise in the progress of the game in a case in which the order of events received varies among different game devices.

DISCLOSURE OF INVENTION

The present invention Was made in consideration of the above, and the present invention has as objects to provide a game system that enables the execution of a game by plural game devices, in which game plural players can respectively operate plural characters that are set in a virtual space, the game system being capable of executing a game in which a response time must be extremely short, with lower probability of producing contradictions in the progress of the game and without increasing the burden in the process of communication. Moreover, the present invention provides a method for controlling the game system, provides a game device therefor, and provides a program therefor.

In the following, description will be given of the present invention. It should be noted that reference numerals in the attached drawings are shown in parentheses to facilitate understanding of the present invention; however, this is not intended to limit the present invention to the embodiments as shown in the drawings.

To achieve the above objects, according to one aspect, the present invention provides a game system (100) that has a relay device (A1) and plural game devices (5), the game system (100) capable of enabling a game to be executed among a predetermined number of game devices (5) grouped from among the plural game devices (5), and in this game, plural players respectively operate plural characters that are set in a virtual space. In this game system, each of the game device (5) has a communicator (514) that performs a communication; a display (52) that displays an image associated with the game; an operation signal outputter (56, 59, 543 to 545) that outputs an operation signal (D1, TG1, OP1, OP) in response to an operation performed by a player of the game device (5); a processor (511) that generates, based on the operation signal (D1, TG1, OP1, OP), a game information set specifying a move of a player character operated by the player, and that causes images to be displayed on the display (52), one of the images corresponding to the move of the player character in the virtual space and another of the images corresponding to a move of an opponent character in the virtual space operated by a player of an opponent game device (5), the images having been generated based on the game information set of the player character and a game information set specifying the move of the opponent character obtained from the opponent game device (5), with the opponent game device (5) being another of the grouped game devices (5) that have been grouped by using the communicator (514); and a transmitter (511) that transmits, to the relay device (A1), the game information set of the player character generated by the processor (511). Furthermore, the relay device (A1) transmits, to a part or all of the grouped game devices (5), game information sets received from the grouped game devices (5) in an order in which the game information sets were received at the relay device (A1).

In this game system, one virtual space is shared by plural game devices, and each of the plural characters is caused to move in response to an operation performed by each player through operating an input unit (56, 59, 543 to 545) at each game device. In this case, the move of the player character can be identified based on an operation signal of the operation signal outputter, but the move of an opponent character cannot be identified without obtaining a game information set of the opponent game device. Furthermore, since the plural game devices are located in different places, the communication delay times are different from one another. In a situation in which each of the grouped game devices transmits to all of the other game devices a game information set specifying a move of a character operated by a player of the each game device, contradictions may arise in the progress of the game due to differences in the communication delay time. According to the present invention, however, because a game device transmits a game information set to the specific game device, the chronological order of the game information sets can be fixed at the specific game device. The relay device then transmits the game information sets to each of the grouped game devices, thereby avoiding contradictions. Moreover, because the moves of the player character are immediately reflected by the images at a game device the player character belongs to, a time required for an operation to be reflected by an image is considerably reduced when compared with a case in which a server device performs all the processes.

According to a preferred embodiment of the present invention, the above game system (100) further has a server device (1), the server device (1) having: a grouper (11, S2, S8) that, upon receiving from the plural game devices (5) participation requests for participation in the game, forms a group consisting of the predetermined number of game devices (5) that have transmitted the participation requests as game devices (5) that will participate in the game; and a specifier that specifies one of the grouped game devices (5) as a specific game device (A1), wherein the one game device (5) of the grouped game devices (5) specified as the specific game device (A1) functions as the relay device (A1), to transmit the game information sets received from the grouped game devices (5) to the part or all of the grouped game devices (5) in an order in which the game information sets were received. According to the present invention, a separate relay device does not have to be provided because the functions of the relay device can be incorporated into one of the game devices. Furthermore, the relay device merely transmits game information sets in an order in which the game information sets were received and does not perform determinations relating to the progress of a game. Therefore, the processing burden of a game device that functions as a relay device is moderate.

Preferably, in the above game system (100), the relay device (A1) may transmit the game information sets received from the grouped game devices (5) in an order in which the game information sets were received, and the game information sets may be transmitted to game devices (5) excluding the respective sender game devices (5) of the respective game information sets. Because a game device having transmitted a game information set has the game information set, the communication resources can be saved by excluding the sender game device from the game devices to which the game information set is to be transmitted.

More specifically, the transmitter (511) of the game device (5) not specified as the specific game device (A1) from among the grouped game devices (5) transmits, to the specific game device (A1), the game information set generated by the processor (511) by means of the communicator (514); and the game device (5) specified as the specific game device (A1) further comprises a relayer that functions as the relay device (A1) by processing the game information set received from the opponent game device (5) via the communicator (514) and the game information set received from the processor (511) in the order in which the game information sets were received, transmitting the game information set received from the opponent game device (5) to the processor (511) of the specific game device (A1), and transmitting the game information set generated by the processor (511) of the specific game device (A1) to the opponent game device (5). In this case, the predetermined number of grouped game devices (5) may preferably include at least three of the plural game devices (5), with one of the three game devices (5) being specified as the specific game device (A1); and the relayer of the specific game device (A1) may transmit the game information set received from the opponent game device (5) to a part or all of the opponent game devices (5). Furthermore, the relayer may preferably transmit the game information set received from the opponent game device (5) to the opponent game devices (5) excluding the transmitter (511) of the game information set and to the processor (511) of the game device (5) specified as the specific game device (A1). Because a game device that has transmitted a game information set to the echo server already has the game information set, communication resources can be conserved by excluding the sender game device from game devices to which the game information is to be transmitted.

In still another preferred embodiment of the present invention, in the above game system (100), the processor (511) of the game device (5) executes: a process of causing an image to be displayed on the display (52), the image corresponding to a move of the player character based only on a game information set generated by the processor (511) of the game device (5); a process of causing an image to be displayed on the display (52), the image corresponding to a move of the opponent game character, based only on a game information set obtained from the opponent game device (5); and a process of causing an image to be displayed on the display (52), the image corresponding to a move of the player character based on a game information set generated by the processor (511) of the game device (5) and a game information set obtained from the opponent game device (5). In the present invention, an "image corresponding to a move of the player character only based on a game information set generated in the processor of the game device" is, for example, an image in which a view is changed as the player character moves. An "image corresponding to a move of the player character based on a game information set generated by the processor of the game device and a game information set obtained from the opponent game device" includes an image in which a bullet shot by the player character hits the opponent character and an image in which a bullet shot by the opponent character hits the player character. Thus, an image having no relationship to an operation of another game device is generated at a single game device for display, and an image relating to an operation of another game device is generated in association with an operation of another game device. Therefore, the processing load of the processor is reduced, and a response time is reduced from a time an operation of a character took place until an image corresponding to the operation is displayed.

In still another aspect, in the above game system (100), the processor (511) has: a position information manager (511, SA2, SA3) that generates and manages position information showing a position of the player character in the virtual space based on the operation signal (D1, TG1, OP1, OP); a storage device (512) that stores plural reference positions that are set in the virtual space and designation information designating each of the plural reference positions; a reference position shifter (511, SA6, SA7) that, upon a position of the player character exceeding a predetermined range having one of the reference positions as its center, shifts the position of the player character to a contiguous reference position, and obtains, by referring to the storage device (512), specific information corresponding to the reference position after the shift, the specific information then being supplied to the transmitter (511); and a display controller (511, SG1 to SG12) that executes a process of generating position information specifying a position of the player character and displaying on the display (52) an image viewed from a position specified by the position information and a process of, upon receiving via the communicator (514) the designation information of the opponent character as the game information set, displaying, on the display (52), by referring to the storage device (512), an image of the opponent game character located at the reference position designated by the designation information of the opponent character. The position information is usually defined by coordinates in a virtual space. The amount of communication is increased if position information is transmitted in response to every tiny move of a character. According to the present invention, however, communication is performed in a case in which a reference point is transferred to another one. Furthermore, the designation information of the new reference point, not the position information thereof, is transmitted, whereby the amount of communication is considerably reduced.

In another aspect, the present invention provides a game device (5) capable of performing a game in which plural players respectively operating plural characters that are set in a virtual space with an opponent game device (5) that is another game device (5) of a group to which the game device (5) belongs, wherein one of game devices (5) belonging to the group is a game device (5) that is specified as a specific game device (A1), the game device (5) having: a communicator (514) that performs a communication; a display (52) that displays an image associated with the game; an operation signal outputter (56, 59, 543 to 545) that outputs an operation signal (D1, TG1, OP1, OP) in response to an operation performed by a player of the game device (5); a processor (511) that generates, based on the operation signal (D1, TG1, OP1, OP), a game information set specifying a move of a player character operated by the player, and that causes images to be displayed on the display (52), one of the images corresponding to the move of the player character in the virtual space and another of the images corresponding to a move of an opponent character in the virtual space operated by a player of the opponent game device (5), the images having been generated based on the game information set of the player character and a game information set specifying the move of the opponent character obtained from the opponent game device (5); and a transmitter (511), in a case in which the game device (5) is not specified as the specific game device (A1), that transmits, via the communicator (514), the game information set generated by the processor (511) to the specific game device (A1); and a relayer, in a case in which the game device (5) is specified as the specific game device (A1), that processes the game information set received from the opponent game device (5) via the communicator (514) and the game information set received from the processor (511) in an order in which the game information sets were received, that transmits the game information set received from the opponent game device (5) to the opponent game device (5) and to the processor (511) of the specific game device (A1), and that transmits the game information set generated by the processor (511) of the specific game device (A1) to the opponent game device (5).

This game device shares one virtual space with at least one opponent game device, and each player operates an input unit (56, 59, 543 to 545), thereby moving each of the plural characters. In a situation in which each of the grouped game devices transmits to all of the other game devices a game information set specifying a move of a character operated by a player of each game device, contradictions may arise in the progress of the game due to differences in the communication delay time. According to the present invention, because a game device transmits a game information set to the specific game device, the chronological order of the game information sets can be fixed at the specific game device. The relay device then transmits the game information sets to each of the grouped game devices, thereby avoiding contradictions. Moreover, because the moves of the player character are immediately reflected by the images at a game device the player character belongs to, a time required for an operation to be reflected by an image is considerably reduced when compared with a case in which a server device performs all of the processes.

In still another aspect, the present invention provides a program for use in a game device (5) capable of performing a game in which plural players respectively operating plural characters that are set in a virtual space with an opponent game device (5) that is another game device (5) of a group to which the game device (5) belongs, wherein one of game devices (5) belonging to the group is a game device (5) that is specified as a specific game device (A1), the game device (5) having: a communicator (514) that performs a communication; a display (52) that displays an image associated with the game; an operation signal outputter (56, 59, 543 to 545) that outputs an operation signal (D1, TG1, OP1, OP) in response to an operation performed by a player of the game device (5); and a program executor (511) that executes a program, the program for causing the program executor (511) to execute: a process of generating, based on the operation signal (D1, TG1, OP1, OP), a game information set specifying a move of a player character operated by the player of the game device (5); a process of causing images to be displayed on the display (52), one of the images corresponding to the move of the player character in the virtual space and another of the images corresponding to a move of an opponent character in the virtual space operated by a player of the opponent game device (5), the images having been generated based on the game information set of the player character and a game information set specifying the move of the opponent character obtained from the opponent game device (5); a process of transmitting, in a case in which the game device (5) is not specified as the specific game device (A1), via the communicator (514), the game information set generated by the game device (5) to the specific game device (A1); and a process of, in a case in which the game device (5) is specified as the specific game device (A1), processing the game information set received from the opponent game device (5) via the communicator (514) and the game information set of the game device (5) in chronological order, transmitting the game information set received from the opponent game device (5) to the opponent game device (5), and transmitting the game information set generated at the game device (5) to the opponent game device (5).

According to the present invention, because the program executor of the game device transmits a game information set to the specific game device by executing the program, the chronological order of the game information sets can be fixed at the specific game device. The relay device then transmits the game information sets to each of the grouped game devices, thereby avoiding contradictions. Moreover, because the moves of the player character are immediately reflected by the images at a game device the player character belongs to, a time required for an operation to be reflected by an image is considerably reduced when compared with a case in which a server device performs all of the processes.

In another aspect, the present invention provides a method of controlling a game system (100) having a relay device (A1) and plural game devices (5), each of the plural game devices (5) having a communicator (514) that performs a communication, a display (52) that displays an image associated with the game, an operation signal outputter (56, 59, 543 to 545) that outputs an operation signal (D1, TG1, OP1, OP) in response to an operation performed by a player of the game device (5) the game system (100) and capable of enabling a game in which plural players respectively operating plural characters that are set in a virtual space to be executed among a predetermined number of grouped game devices (5), the method having: the game device (5) generating, based on the operation signal (D1, TG1, OP1, OP), a game information set specifying a move of a player character operated by the player, the game device (5) causing images to be displayed on the display (52), one of the images corresponding to the move of the player character in the virtual space and another of the images corresponding to a move of an opponent character in the virtual space operated by a player of an opponent game device (5), the images having been generated based on the game information set of the player character and a game information set specifying the move of the opponent character obtained from the opponent game device (5), with the opponent game device (5) being another of the grouped game devices (5) that have been grouped by using the communicator (514); and the game device (5) transmitting, to the relay device (A1), the generated game information via the communicator (514); and the relay device (A1) transmitting, to a part or all of the grouped game devices (5), game information sets received from the grouped game devices (5) in an order in which the game information sets were received at the relay device (A1).

According to this method of controlling a game system, because plural game devices transmit game information sets to a relay device, the chronological order of the game information sets can be fixed at the relay device. The relay device then transmits the game information sets to each of the grouped game devices, thereby avoiding contradictions. Moreover, because the moves of the player character are immediately reflected by the images at a game device the player character belongs to, a time required for an operation to be reflected by an image is considerably reduced when compared with a case in which a server device performs all the processes.

EFFECTS OF THE INVENTION

According to the present invention, it is possible to execute a game in which a response time must be extremely short, with a lower probability of producing contradictions in the progress of the game and without increasing the burden in the process of communication.

BEST MODE FOR CARRYING OUT THE INVENTION

1. Game System

Figure 1:
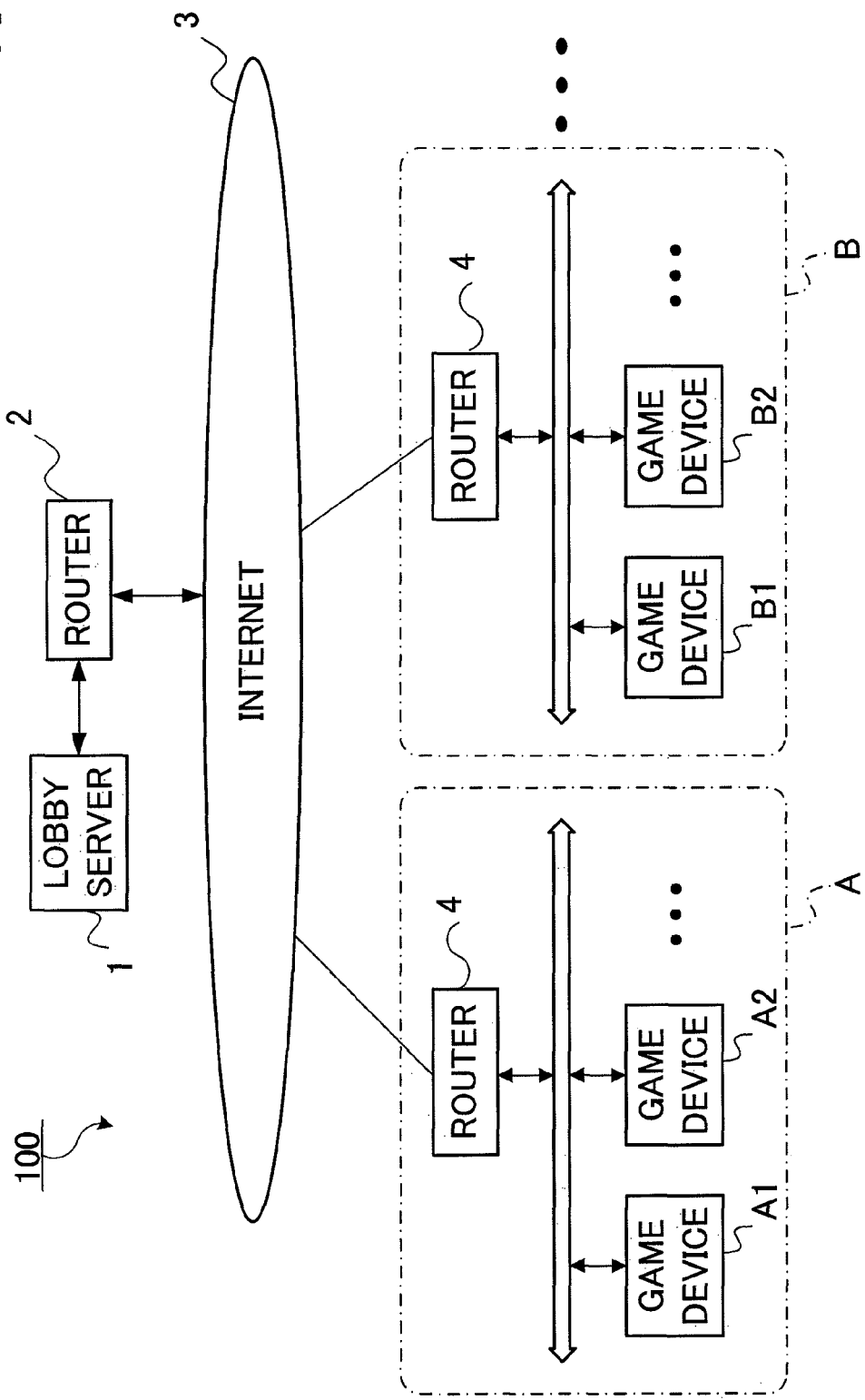
FIG. 1 is a diagram showing an overall configuration of a game system according to a first embodiment of the present invention.

FIG. 1 shows an overall configuration of a game system 100 according to an embodiment of the present invention.

Game system 100 has plural game devices, and the system is capable of performing a so-called "multiple-player online game" that is, in this embodiment, a shooting game in which plural players of the plural game devices operate characters of the players to exchange gunfire, the characters being set in a 3-dimensional virtual space.

Game system 100 is provided with a lobby server 1. Lobby server 1 is connected to an Internet 3 via a router 2 and is for grouping a predetermined number of game devices from among plural game devices that will participate in a game. Connected to the Internet 3 are a router 4 sited in each of plural game venues A, B, etc. Plural game devices A1, A2, . . . are located in the game venue A, and plural game devices B1, B2, . . . are located in the game venue B. In the following, each game device will be referred to as "game device 5" unless it is necessary to identify each game device. Each game device 5 is capable of communicating via router 4 with lobby server 1 and with at least one opponent game devices 5. A communication network other than the Internet 3 can be used instead as long as the network is capable of serving the game devices in such a way that each game device is enabled to communicate with the lobby server and opponent game devices.

2. Game Device 2-1. External View

Figure 2:
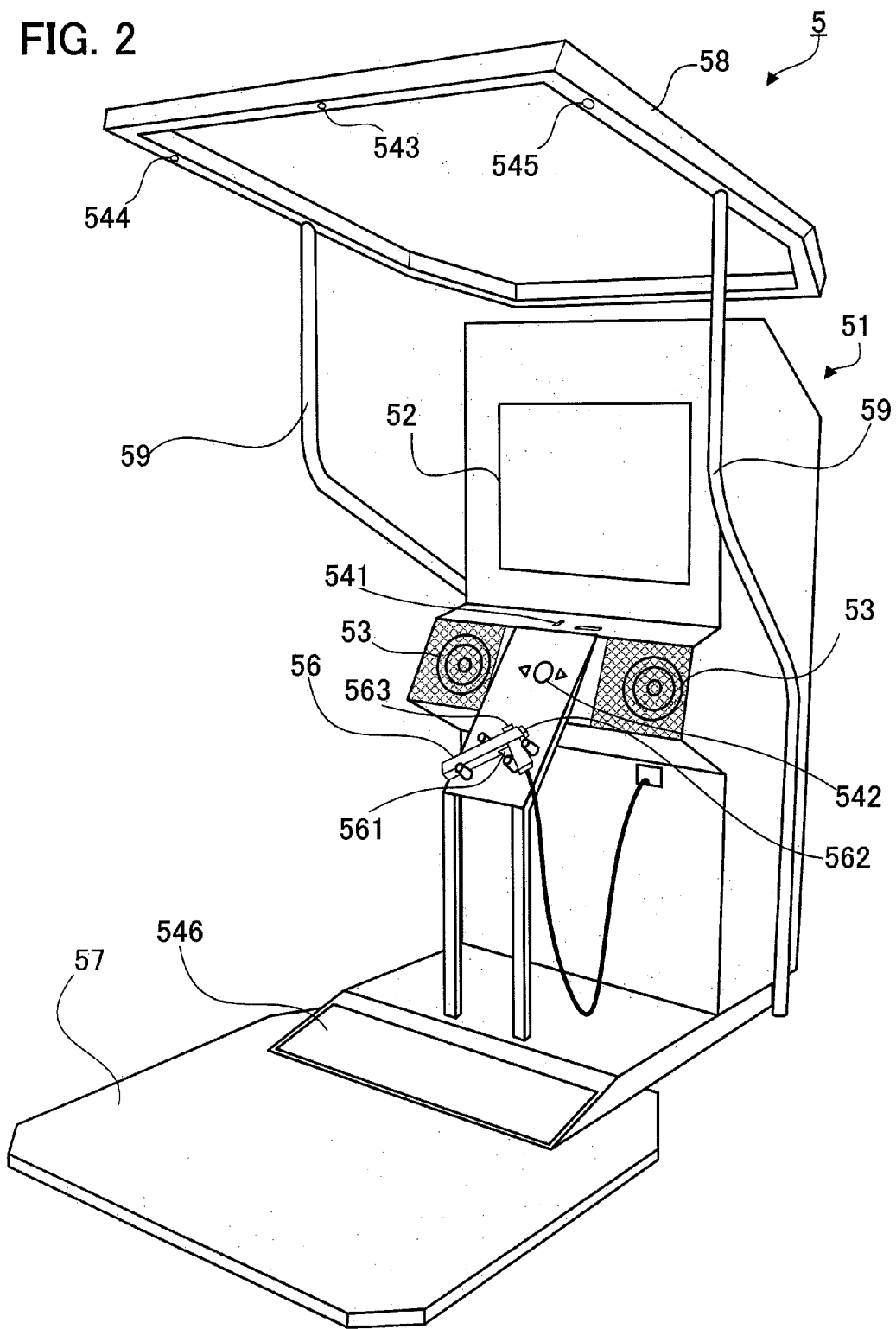
FIG. 2 is a perspective view showing an external view of a game device included in the game system.

FIG. 2 shows an external view of game device 5.

There is provided in the upper portion of a body 51 of game device 5 a display device 52 for displaying game images by scanning through a rectangular screen every period of vertical scanning. A monitor or a pair of a screen and a video projector can be used as display device 52. A game image is an image of a virtual space when viewed from a character operated by the player (hereinafter referred to as a "player character") of this game device 5. Thus, at least one opponent character operated by at least one player of at least one opponent game device 5 is the only character displayed on the screen.

An acoustic device 53 is provided in the central portion of body 51. Acoustic device 53 has an amplifier and a speaker so as to emit sound generated during a game. There are also provided in the central portion of body 51 a coin inlet 541 into which predetermined coins are inserted and a start button 542 that is used for inputting a start operation of a game.

Furthermore, connected via a cable to the central portion of body 51 is a gun unit 56 that simulates the appearance of a real gun. Gun unit 56 is operated by a player of this game device 5 to cause a player character to fire a gun or to change a facing direction or a posture of the player character, and it has a trigger 561 and option buttons 562 and 563 that may be operated by a player. Trigger 561 is used for inputting a firing operation of a bullet. Option button 562 is used for inputting a switching operation of a target character. A target character is a character which a player character is targeting, and a facing direction of a player character usually changes if the target character is changed. As a result, a view point of the player character changes, which in turn causes an image displayed on the screen to change. Option button 563 is used for inputting an operation of changing a posture (a sitting position or a standing position) of a player character.

Provided in the lower portion of body 51 is a platform 57 for a player to step on in playing a shooting game, and a player plays a game, standing on platform 57. Platform 57 is positioned to the front side of the display so that a player is able to see the screen. Furthermore, the top surface of platform 57 is infrared-ray reflective. In the lower portion of body 51, a foot pedal 546 is positioned to the display side of platform 57. Foot pedal 546 is used for inputting an operation of advancing a player character.

A frame 58 is fixed to body 51, being supported by a supporting pole 59. Frame 58 extends toward the front side of the display, so that the bottom surface of the front portion of the frame faces the top surface of platform 57 across a player standing on platform 57. Provided on a portion of the bottom surface of frame 58, with the portion facing platform 57, are position sensors 543 to 545 for detecting a position of a player on platform 57. Position sensor 543 is provided at the center, position sensor 544 in the left side, and position sensor 544 in the right side when viewed from a direction facing the display. Each position sensor is an optical sensor, and it emits infrared rays in a downward vertical direction. The rays are reflected by the top surface of platform 57 and received by the position sensor if the reflected light reaches the sensor from the downward vertical direction, and the position sensor then outputs a signal indicating a level of the received light. Furthermore, position sensors 543 to 545 are positioned so that each path of the received light passes behind, to the left, and to the right of a player standing at a predetermined position. A tilt angle of the body of a player body can be detected based on output signals from position sensors 543 to 545. In a case in which a player tilts the body rightward, an instruction for advancing the player character rightward is input, whereas in a case in which a player tilts the body leftward, an instruction for advancing the player character leftward is input, as will be described later in detail.

2-2. Configuration

Figure 3:
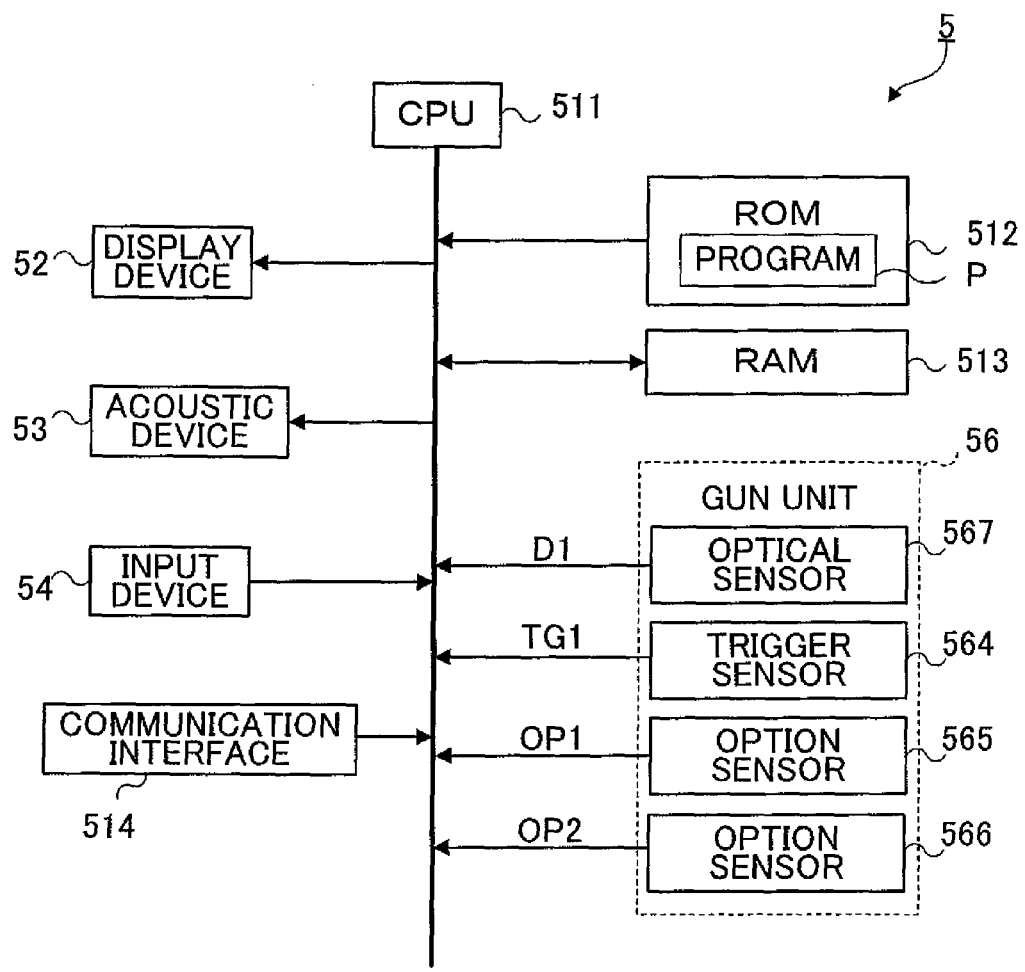
FIG. 3 is a block diagram showing a configuration of the game device.

FIG. 3 is a block diagram showing a configuration of game device 5. As shown in the figure, game device 5 has a CPU 511. Connected to CPU 511 are ROM 512 and RAM 513. CPU 511 executes a program P stored in ROM 512, and it functions as a control center of game device 5 by using RAM 513 as a work area.

Also connected to CPU 511 is display device 52. CPU 511 generates an image and supplies an image signal corresponding to the generated image, thereby causing the image to be displayed on a screen of the display device 52. Furthermore, CPU 511, when it detects a trigger signal TG1 (described later), generates a level control signal to forcibly maximize the brightness to supply the signal to display device 52. Display device 52, upon receiving the level control signal, maximizes the brightness of pixels that are being scanned.

Acoustic device 53 is additionally connected to CPU 511. CPU 511 generates sound signals representing sound and supplies the generated sound signals to acoustic device 53, thereby causing acoustic device 53 to emit the sound. Also connected to CPU 511 is a communication interface 514. CPU 511, via communication interface 514, communicates with lobby server 1 and at least one opponent game device 5.

Furthermore, an input device 54 is connected to CPU 511. Input device 54 has coin inlet 541, start button 542, position sensors 543 to 545, and foot pedal 546. Input device 54, in a case in which a predetermined coin is inserted into coin inlet 541, outputs a signal indicating that the coin has been inserted; in a case in which start button 542 is operated, outputs a signal accordingly; outputs a signal from each of position sensors 543 to 545; and outputs a signal indicating whether foot pedal 546 is being stepped on. CPU 511 detects a signal from input device 54, thereby to perform a process corresponding to the details of the detected signal.

For example, CPU 511, in a case of detecting a signal indicating that start button 542 has been operated after detecting a signal indicating that a predetermined coin is inserted into coin inlet 541, communicates with at least one other game device 5 and lobby server 1 to start a device-side grouping process for grouping a predetermined number of game devices. For another example, CPU 511 detects the signals from position sensors 543 to 545 and the signal indicating whether foot pedal 546 is being stepped on, thereby to compute a location of a player character. That is, position sensors 543 to 545 and foot pedal 541 are each used for inputting instructions for moving a player character, and they each function as an operation signal outputting unit that outputs a signal (i.e., an operation signal) corresponding to an operation performed by a player.

Also connected to CPU 511 is gun unit 56. Gun unit 56 has a trigger sensor 564, option button sensors 565 and 566, and an optical sensor 567 in addition to trigger 561 and option buttons 562 and 563. Trigger sensor 564 detects that a trigger 561 of gun unit 56 has been pulled, thereby to output a trigger signal TG1. Option sensor 565 detects that option button 562 has been depressed, thereby to output an option signal OP1, and option sensor 566 detects that option button 563 has been depressed, thereby to output an option signal OP2. Optical sensor 567 is provided inside the barrel so that it is able to receive light from the mouth of the gun, and the sensor outputs an aiming signal D1 in a case in which the level of the received light changes from a value below a threshold to a value equal to or above the threshold. CPU 5.11 detects a signal from gun unit 56, thereby performing a process corresponding to the detected signal.

For example, CPU 511, upon detecting option signal OP1, switches a target character. That is, it changes the facing direction of the player character. For another example, CPU 511, when it detects option signal OP2, changes a posture of the player character. That is, the posture of the player character is changed to a sitting position if the player character is currently in a standing position, and to a standing position if the player character is currently in a sitting position. In yet another example, CPU 511, when it detects trigger signal TG1, causes the player character to fire a gun. Thus, a gun unit 56 is used for inputting instructions for moving the player character, and it therefore functions as an operation signal outputting unit that outputs a signal (operation signal) corresponding to an operation of a player.

In game system 100, a character dies if a bullet hits the character. That is, a bullet shooting operation is an operation by which the player character could cause an assault action on an opponent character belonging to an opponent game device. When this operation is performed, CPU 511 performs a process of causing the player character to fire a bullet, the process includes first performing a bullet trajectory computation (described later) to generate a bullet trajectory information set that indicates the trajectory of a bullet. An aiming point is information necessary for the bullet trajectory computation, the aiming point being coordinates of a pixel on the screen, and the pixel is a point where a centerline of the barrel reaches when the centerline is extended to meet the screen. The aiming point is identified in a manner described in the following.

2-3. Method for Identifying Aiming Point

Figure 4:
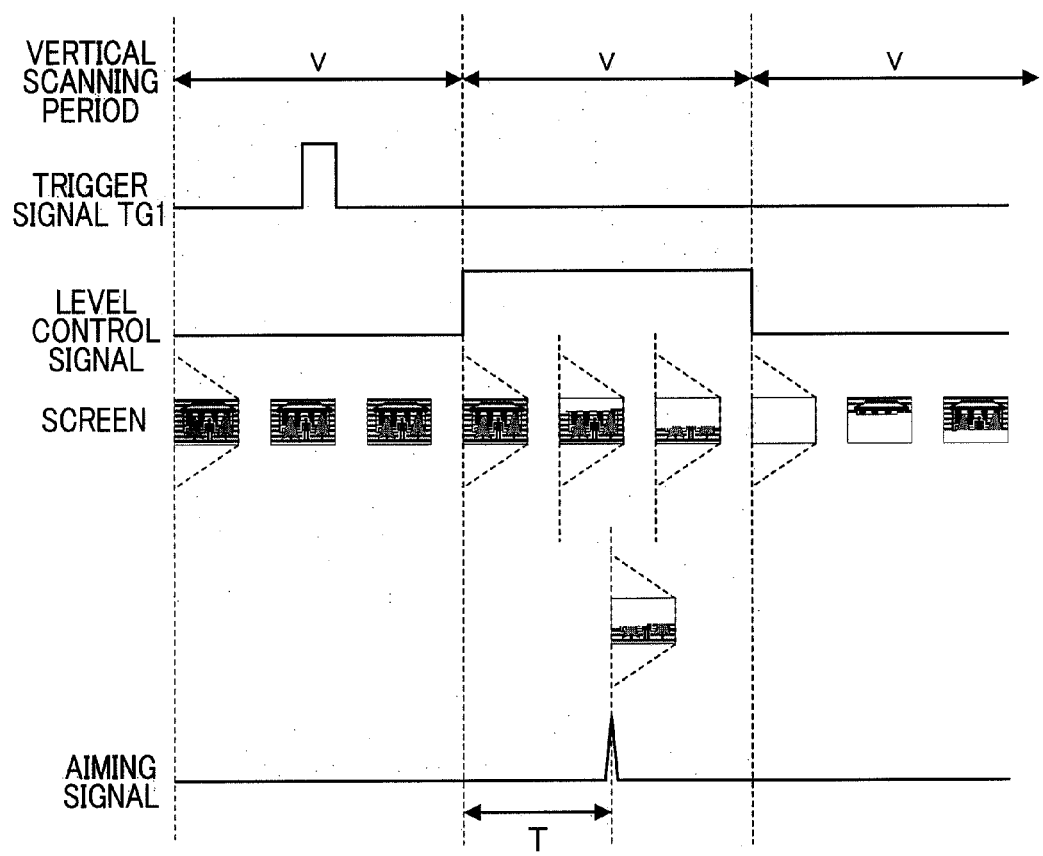
FIG. 4 is a diagram for explaining how to identify an aiming point in the game device.

FIG. 4 is a diagram for describing how to identify an aiming point. As shown in the figure, CPU 511, in a case in which it detects trigger signal TG1 during a vertical scanning period (V), supplies not only an image signal but also a level control signal to display device 52 in the subsequent vertical scanning period (V). As a result, in the subsequent vertical scanning period, the screen is whitened out, i.e., is changed to the maximal brightness. In the process of whitening, an aiming area including a pixel which intersects with the barrel centerline (i.e., a bullet trajectory) of gun unit 56 is also whitened out. The receiving level of optical sensor 567 then changes to a value equal to or above the threshold. As a result, a target signal D1 is output from optical sensor 567 and is detected by CPU 511. CPU 511, upon detecting the target signal D1, identifies an aiming point based on time (T) that has passed from the start of the vertical scanning period. Gun unit 56 is designed so that the aiming area is small enough to identify an aiming point.

3. Lobby Server

Figure 5:
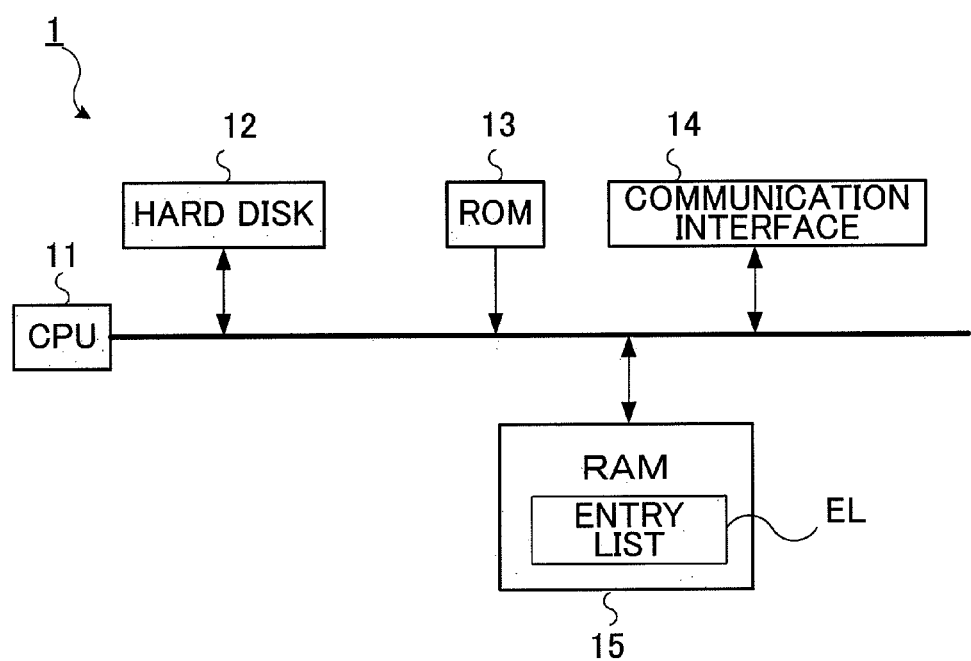
FIG. 5 is a diagram showing a configuration of a lobby server.

FIG. 5 shows a configuration of lobby server 1.

Lobby server 1 performs a server-side grouping process for grouping a predetermined number of game devices 5 in response to participation requests from game devices 5. It has a CPU 11, a hard disk 12, a ROM 13, a communication interface 14, and a RAM 15. CPU 11 reads a boot program from ROM 13 for execution, and it further executes a control program after reading it from hard disk 12, thereby performing a server-side grouping process. RAM 15 functions as a work area for CPU 11, and an entry list EL is stored therein. The entry list EL is for storing communication addresses of game devices 5 and is blank in an initial state.

4. Grouping Process

Figure 6:
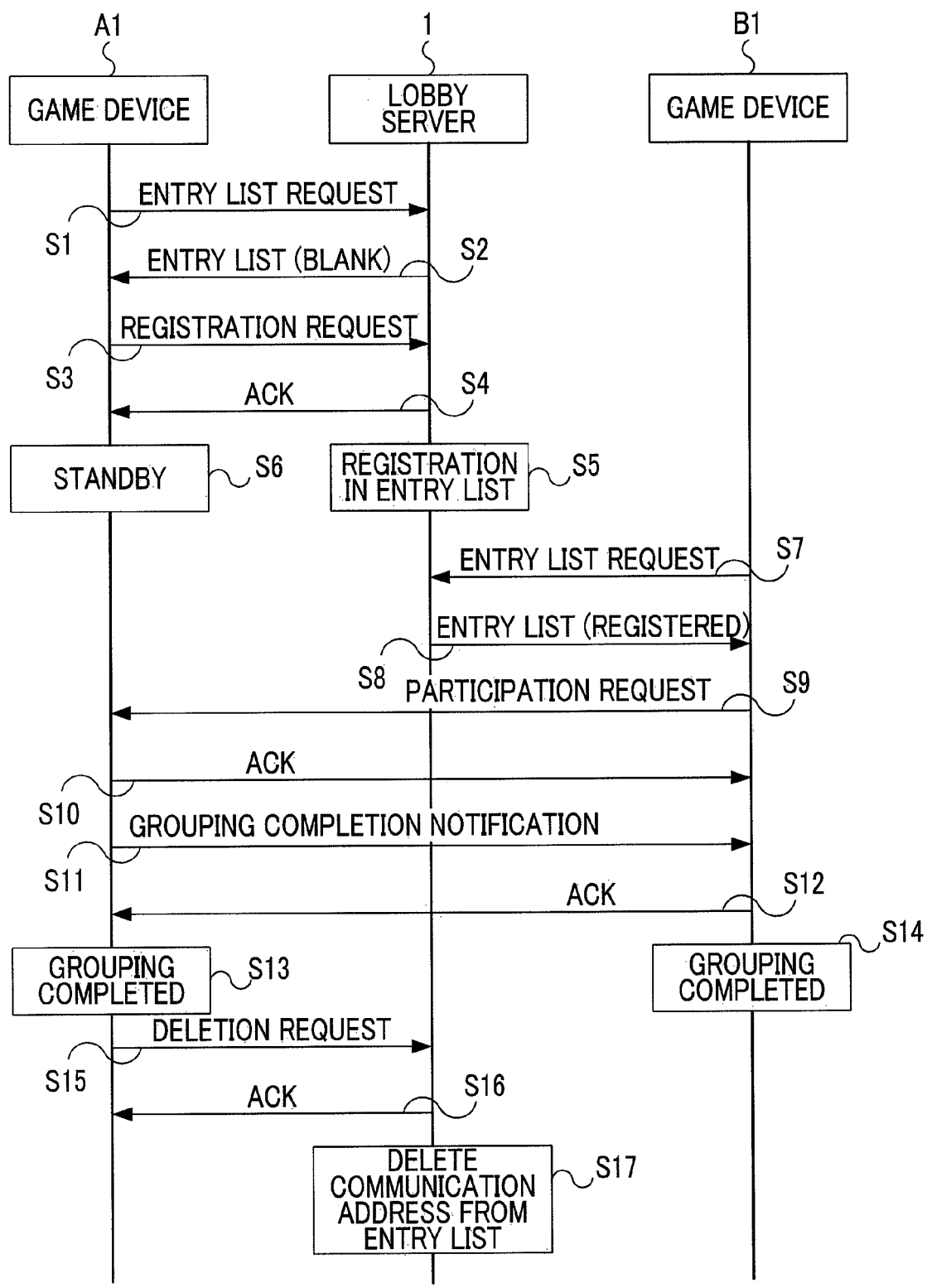
FIG. 6 is a sequence chart showing an example of an operation in a grouping process of the game system.

FIG. 6 is a sequence chart showing an example operation in a grouping process performed in the game system 100. This operational example shows a case in which two game devices 5 are grouped. The number of game devices 5 is set to two in order to avoid the description becoming too complicated, and in actually, more than two game devices (for example, four game devices 5) are grouped. Game devices shown in FIG. 6 perform various processes shown in FIG. 6 in accordance with Program P.

First, in this example operation, in game device A1 of game venue A, start button 542 is operated after a predetermined coin is inserted into coin inlet 541, and a signal is then output accordingly from input device 54. CPU 511 of game device A1, upon detecting the signal, starts a device-side grouping process. Specifically, CPU 511 transmits to lobby server 1 an entry list request requesting the grouping (S1). The entry list request is a request for also requesting the server to transmit an entry list EL. CPU 11 of lobby server 1, upon receiving an entry list request, reads from RAM 15 an entry list EL for transmission to the transmitter game device (S2). At this stage, since there is no other game device 5 having requested the grouping, the transmitted entry list is blank.

CPU 511 of game device A1, upon receiving the entry list EL, determines whether the entry list is blank. Since the entry list EL is blank, the result of the determination changes to affirmative. CPU 511 then transmits to lobby server 1 a registration request containing a communication address of the game device and also requesting the registration of the communication address in the entry list EL (S3). CPU 11, upon receiving the registration request, returns an ACK (acknowledgement) to the game device (S4), whereas CPU 11 writes the communication address contained in the registration request in RAM 15, thereby registering the communication address in the entry list EL (S5). On the other hand, CPU 511 of the game device A1, upon receiving the ACK, changes to a standby state (S6).

In this example, CPU 511 of game device B1 subsequently transmits an entry list request to lobby server 1 (S7). In response, CPU 11 of lobby server 1 reads the entry list EL from RAM 15 for transmission to the transmitter game device (S8). Since the communication address of game device A1 is registered in the entry list, CPU 511 of the game device B1, having received the entry list, transmits, to game device A1 by referring to the communication address, a participation request for requesting the participation in the same group (S9).

CPU 511 of game device A1, upon receiving the participation request, transmits an ACK (S10), confirms that the number of game devices 5 belonging to the same group reaches the predetermined number (2 in this example), then transmits a grouping completion notification to the game device A1 itself and another or other game device(s) 5 belonging to the same group, i.e., game device B1 (S11). CPU 511 of the game device B1, upon receiving the grouping completion notification, returns an ACK (S12). The grouping of game devices A1 and B1 is thus completed (S13, S14).

Subsequently, CPU 511 of game device A1 transmits to lobby server 1 a deletion request that requests deletion of the communication address of the device from the entry list EL (S15). CPU 11 of lobby server 1, upon receiving the deletion request, returns an ACK (S16), whereas it deletes the communication address from the entry list EL (S17). The device-side grouping process is thus completed.

In the above grouping process, CPU 11 of lobby server 1 receives entry list requests from game devices A1 and B1 (S1 and S7). The entry list request is a request that is a precondition for the grouping, and the entry list request is not transmitted in a case in which a player of each game device A1 or B1 plays a game against computers. Thus, the entry list request functions as a participation request for participating in a game. CPU 11 of lobby server 1, until it deletes the communication address of game device A1 from the entry list EL (S5 to S17), functions, by transmitting an entry list EL without an entry or with an entry (S2, S8), as a grouper that forms a group of a predetermined number of game devices 5 as game devices 5 that will participate in one game. More specifically, CPU 11 functions as a grouper that assists the device-side grouping process. Furthermore, CPU 11 functions as a specifier that specifies one game device as a specific game device from among grouped game devices by registering the communication address of the specific game device in the entry list EL when a request for registration is received. In the above example, after game device A1 determines that the entry list EL is blank, game device A1 transmits to lobby server 1 a request for registering the communication address of the game device A1. As a result, CPU 11 of lobby server 1 identifies game device A1 as a specific game device.

In a case in which the predetermined number is equal to or larger than 3, a game device 5 having received a participation request (S2) transmits a permission notification that permits participation to the group to the transmitter game device 5 if it is before the number of game devices 5 desiring to participate in the same game reaches the predetermined number. Both the transmitter and the receiver game devices 5 of the permission notification then change to a standby state. That is, the grouping completion notification (S11) is not transmitted until the number of game devices 5 belonging to the same group reaches the predetermined number.

5. Game Process and Relay Process 5-1. Overview

In the following description, it is assumed that game device 5 operates in accordance with the program P.

Each game device 5 activates a game client for performing a game process once the predetermined number of game devices 5 is decided as belonging to the same group after the device-side grouping process is completed. Furthermore, from among game devices 5, a game device having received the blank entry list EL (i.e., one having registered the communication address to the entry list EL) activates an echo server. That is, one of the predetermined number of game devices functions as a game client and as an echo server (a specific game device; game device A1 in the above example) and at least one other game device functions only as a game client.

A game client transmits and receives game information sets to and from an echo server of the group to which the client belongs in the progressing of the game. A game information set is information that is generated during the shooting game and is necessary for the progressing of the game. The game information set is a concept including state information showing a state of a character such as a position, a viewing point, a facing direction, and a posture and also including result information showing a result of determination (hereinafter referred to as a "hit determination") as to whether a bullet hits a character and a bullet trajectory information set.

The echo server receives game information sets from game clients belonging to the group of the game device functioning as the echo server, and it performs only a relay process of transmitting to all the game clients (including the game device itself that functions as the echo server) each of the game information sets in the order in which the game information sets were received. It should be noted that the present embodiment can be modified so that the original transmitter of a game information set may be excluded from destination game devices of the game information set.

5-2. Relationship Between Game Client and Echo Server

Figure 7:
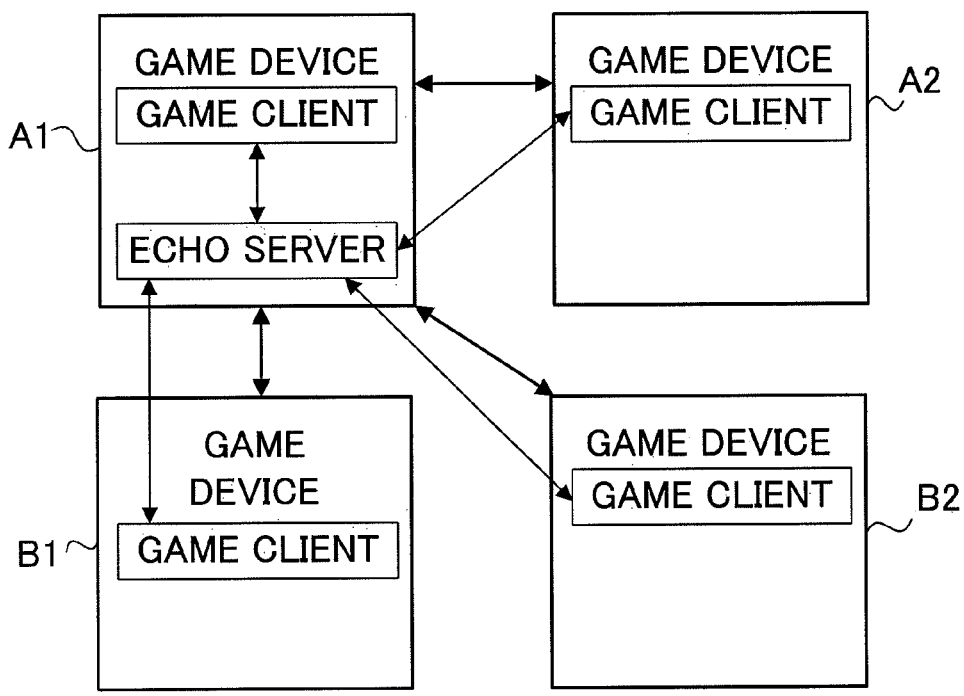
FIG. 7 is a diagram for explaining a relationship between a game device, a game client, and an echo server.

FIG. 7 is a diagram for describing a relationship between game clients and an echo server. In an example shown in the figure, game devices A1, A2, B1, and B2 are being grouped together. Game device A1 functions both as a game client and an echo server, whereas game devices A2, B1, and B2 each functions merely as a game client, and each communicates only with game device A1. Therefore, game devices A2, B1, and B2 only need the communication address of the game device A1.

Communications taking place among game devices 5 can be understood as communications between each game client and the echo server at an upper layer. Therefore, game device A1 that functions as a game client communicates with the game device A1 itself that functions as the echo server. This communication, unlike communications with the other game clients, is performed without involving communication interface 514 and is terminated within the game device A1.

A game client performs a hit determination with respect to a character belonging to the game client. Because the hit determination of a character is performed at game device 5 to which the character belongs (i.e., game device 5 to which an attacked character belongs), results of determinations do not conflict among plural game devices 5. Furthermore, a game client is capable of immediately updating an image to be displayed on its screen in response to operations of a player operating the game client. Thus, a player is able to view, in a sufficiently short response time, the effects rendered in the virtual space by the operation performed by the player.

Additionally, since the communications between game clients are performed through the echo server, contradictions in the progress of a game are unlikely to take place among game devices 5. Comparison is made in the following to a system having no echo server. A system having no echo server includes a center-terminal type system or a master-slave type system, and a system in which plural game devices perform communication on an equal basis. With respect to the former, the center-terminal type system or the master-slave type system, it is difficult to apply this type of system to a shooting game requiring extremely short response times since all the determinations are performed at the center or at the master. Therefore, the latter is used for the comparison.

Figure 8:
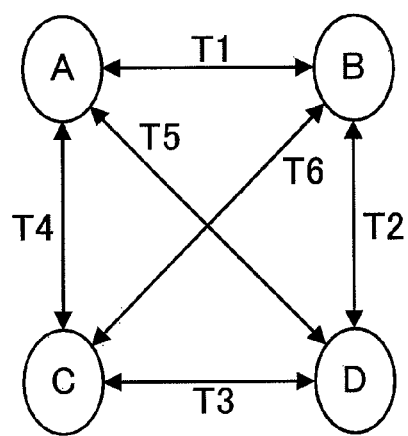
FIG. 8 is a diagram for explaining contradictions that could possibly take place in the progress of the game in a system in which plural game devices perform communication on an equal basis without involving an echo server.

5-3. Comparison Between Configuration with Use of and without Use of Echo Server FIG. 8 is a diagram for describing contradictions that could arise in the progress of a game in a game system in which plural game devices perform communications on an equal basis without involving an echo server. In the system shown in the figure, game devices "A" "B", "C", and "D" directly communicate with one another. It is assumed that communication delay time between game devices "A" and "B" is T1; communication delay time between game devices "B" and "D" is T2: communication delay time between game devices "C" and "D" is T3; communication delay time between game devices "A" and "C" is T4; communication delay time between game devices "A" and "D" is T5; and communication delay time between game devices "B" and "C" is T6, where T1<T2<T3<T4<T5<T6.

In the system, it is assumed that events simultaneously occur at all the game devices and that each game device notifies the others of the events that have just occurred. In this case, the time required for a game device to detect an event at another game device will be as shown in the figure. For example, the time required for the game device "A" to detect an event that occurred at the game device "C" will be T4, and for the game device "B", it will be T6. In another example, the time required for the game device "A" to detect an event that has occurred at the game device "D" will be T5, and for the game device "B", it will be T2.

Focusing on the order in which an event is detected at different game devices, the game device "A" detects the event that has occurred at the game device "C" before detecting the event that has occurred at the game device "D", whereas the game device "B" detects the event that has occurred at the game device "D" before detecting the event that has occurred at the game device "C". That is, the order of the event at the game device "C" and the event at the game device "D" detected at the game device "A" are reversed in order compared with the order: in which the same events are detected at the game device "B"; that is, the orders of detection are not the same. Such a difference in the detecting order between different devices is one of the causes of contradictions that could arise in the progress of a game among plural game devices.

Conversely, in the present embodiment, game information sets from game clients are always transmitted to the echo server, and the echo server transmits, to all the clients belonging to the same group, the game information sets in a received order. For example, in a case in which the game device A1 and B1 each transmits a game information set to the echo server, the echo server transmits these game information sets to game devices A1, A2, B1, and B2, in a received order. Therefore, the order of receiving the game information sets at game device A2 is always the same as the order in which game device B2 receives the game information sets. This is why contradictions in the progress of a game are unlikely to arise among game devices 5.

5-4. Various Processes at Game Client

Detailed description will be next given of various processes performed by each game client in the game process. In the following, as shown in FIG. 7, game devices A1, A2, B1, and B2 are grouped together, and game device A1 functions as the echo server. It is to be noted that various processes described in the following are executed in parallel by CPU 511 of game device 5, and the game client operates in parallel with the echo server.

5-4-1. Position Information Generation and Management Process

Figure 9:
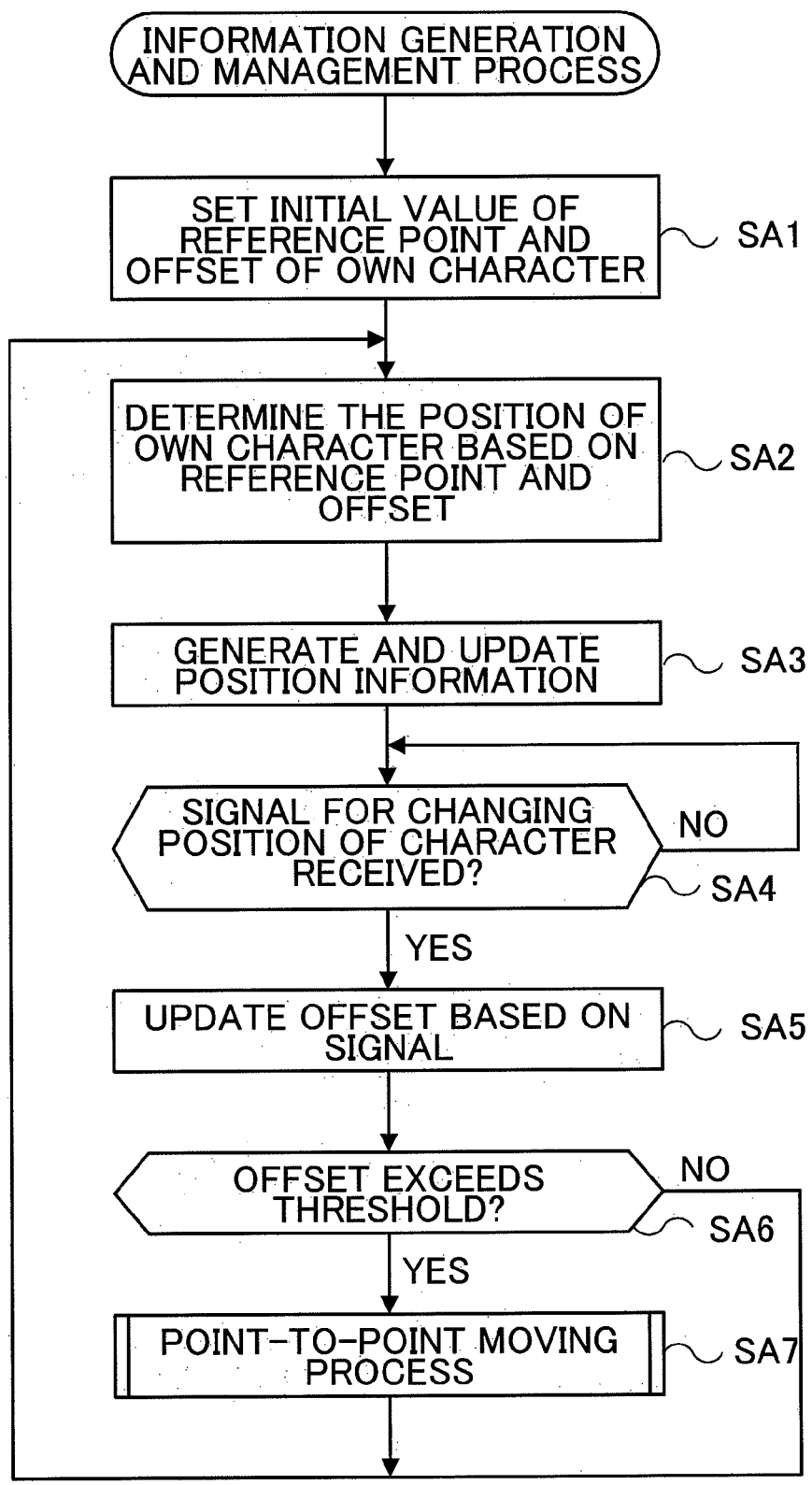
FIG. 9 is a flow chart showing a position information generation and management process of the game device.

FIG. 9 is a flow chart showing a flow of a position information management process for generating and managing position information indicating the position of a player character. In the position information generation and management process, a game client first sets a reference point and an initial value of an offset (SA1). The reference point is a point of reference in moving a character in a virtual space. Plural reference points are set in a virtual space, and each reference point is specified by coordinates X, Y, and Z. In a case in which a virtual space is divided into a grid along X, Y, and Z axes, each grid dot may be set as a reference point. Specifically, for each reference point, its identifier (e.g., "P001") and its coordinates (reference position) are stored in association with one another in ROM 512 of game device 5. There is also stored in ROM 512 map information showing the locations of objects in a virtual space.

The offset is a distance from coordinates of a reference point, and its initial values are zero in all directions of the X, Y, and Z axes in each game client. On the other hand, an initial value of a reference point of a character depends on a game client. The initial value of the reference point can be arbitrarily determined; for example, it may be determined in the grouping process.

Subsequently, the game client determines the position of a player character based on the reference point and the offset of the player character (SA2). The position of a character is expressed in coordinates in a virtual space and is identified by adding the offset of the character to the reference point of the character. Subsequently, position information showing the identified position is generated, and the position information is written in a predetermined area of RAM 513, thereby updating the position information of the player character (SA3).

The game client then determines whether it has received a signal for changing the position of the player character, the signal corresponding to a player's operation (SA4). In a case in which the result of the determination changes to "NO", the determination is repeated until the signal is output. In a case in which the result of the determination changes to "YES", the game client updates the offset based on the signal (SA5). The update is performed in the manner described below in detail.

In a case in which a signal indicating a low degree of a light receiving level from position sensor 543 is detected, it is determined that the player is leaning backwards, and therefore, the offset is updated so that the position of the player character moves for a predetermined amount towards a rear side of the character. In a case in which a signal indicating a low degree of a light receiving level from position sensor 544 is detected, it is determined that the player is leaning leftwards, and therefore, the offset is updated so that the position of the player character moves for a predetermined amount towards a left side of the character. In a case in which a signal indicating a low degree of light receiving level from position sensor 545 is detected, it is determined that the player is leaning rightwards, and therefore, the offset is updated so that the position of the player character moves for a predetermined amount towards a right side of the character.

The game client subsequently determines whether the offset has exceeded a predetermined threshold (SA6). The threshold is set so as to prevent a player character from transferring to a contiguous reference point without changing the current reference point. The threshold and reference points are determined so that, in a case in which the offset of a character exceeds the threshold, another reference point always exists which is closer than the current reference point to the current position of the character. In a case in which the result of the determination is "NO", the process returns to Step SA2. In a case in which the result of the determination changes to "YES", a point-to-point moving process is performed for changing the reference point of the player character (Step SA7).

5-4-2. Point-to-Point Moving Process

Figure 10:
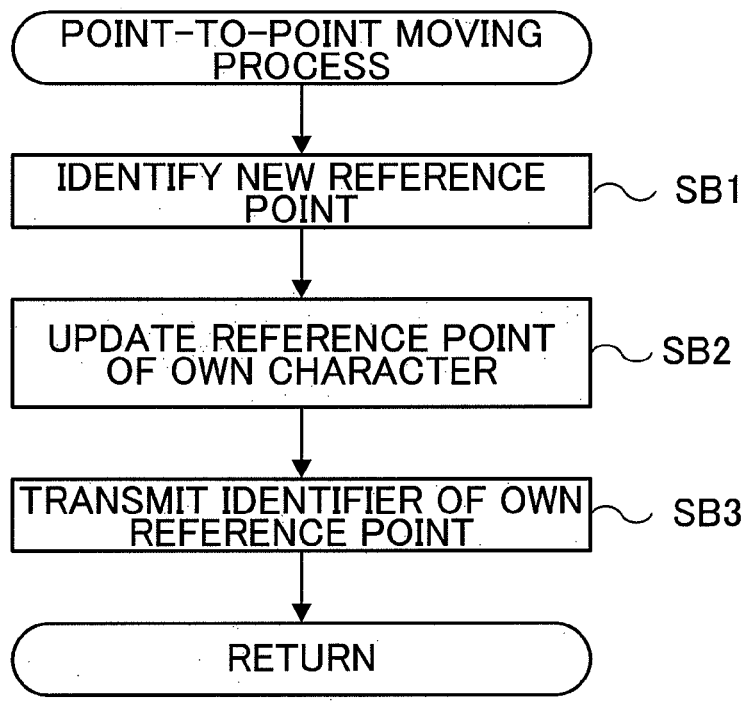
FIG. 10 is a flow chart, showing a point-to-point moving process of the game device.

FIG. 10 is a flow chart showing a flow of the point-to-point moving process.

In the point-to-point moving process, the game client first identifies a new reference point (SB1). Specifically, the game client identifies the position of the player character on the basis of the reference point and the offset of the player character, to identify a new reference point that is the closest to the position. Subsequently, the identified reference point is determined as a new reference point of the player character, and the offset is then initialized (SB2). The game client then transmits the identifier of the new reference point to the echo server (game device A1) (SB3). The routine then returns to the position information generation and management process of FIG. 9 and to the process of Step SA2.

The identifier transmitted in Step SB3 is received by the echo server and is then transmitted as a game information set together with the communication address of the transmitter game device 5 to all the game clients belonging to the same group (game devices A1, A2, B1, and B2). The game information set is received by each game client. Game clients other than the game client having transmitted the identifier each stores position information indicating coordinates of a reference point corresponding to the identifier contained in the received game information set as the position information of a character belonging to game device 5 having the communication address contained in the game information set.

5-4-3. Facing Direction Information Generation and Management Process

Figure 11:
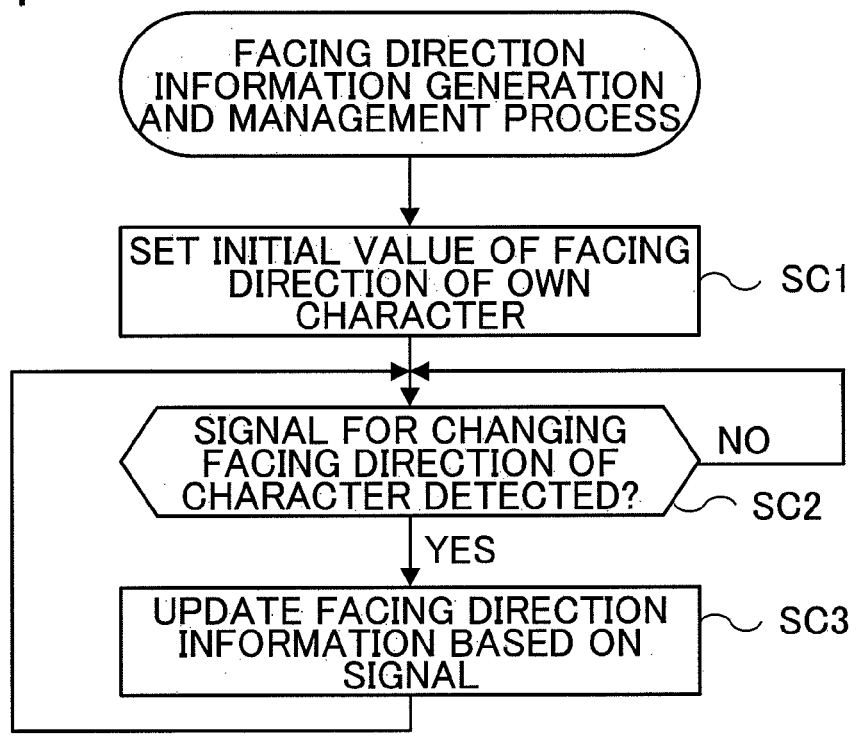
FIG. 11 is a flow chart showing a facing direction information generation and management process of the game device.

FIG. 11 is a flow chart showing a flow of a facing direction information generation and management process for generating and managing facing direction information indicating a facing direction of a player character. In the facing direction information generation and management process, the game client first sets an initial value as facing direction information of a player character (SC1). Specifically, the game client writes the initial value as the facing direction information of the player character in RAM 513. The initial value is arbitrary and can be arbitrarily determined.

The game client then determines whether it has detected a signal corresponding to an operation of the player for changing the facing direction of the player character, specifically whether it has detected the option signal OP1 (SC2). In a case in which the result of the determination changes to "NO", the determination is repeated until the signal is output. In a case in which the result of the determination is "YES", the client updates the facing direction information based on the signal (SC3). The routine then returns to Step SC2.

The facing direction information is updated as follows depending on the situation.

In a case in which the target character has not been set, one of the opponent characters is set as the target character, and the facing direction information is updated so that the player character has a direct view of the target character.

In a case in which the target character has been set, one of the opponent characters (other than the target character) is selected as a target character, and the facing direction information is updated so that the target character is positioned in right front of the player character. In a case in which the number of opponent characters is one even when the target character has been set, the selection of a new target character is not performed; that is, the sole opponent character is regarded as the target character. The facing direction information is then updated so that the target character is positioned in right front of the player character.

5-4-4. Posture Information Generation and Management Process

Figure 12:
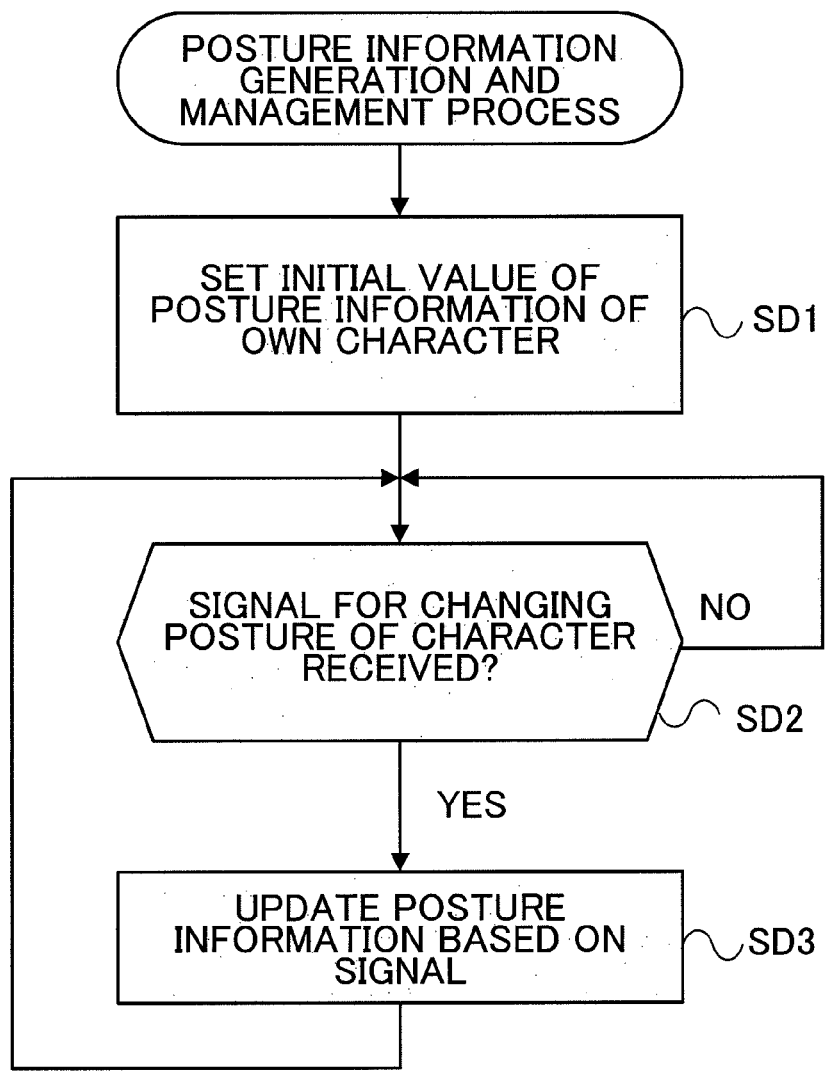
FIG. 12 is a flow chart showing a posture information generation and management process of the game device.

FIG. 12 is a flow chart showing a flow of a posture information generation and management process for generating and managing posture information showing a posture of a player character. In the posture information generation and management process, a game client first sets an initial value as posture information of the player character (SD1). Specifically, the initial value is written in RAM 513 as the posture information of the player character. In the present embodiment, the initial value is predetermined as a value indicating the character being in a standing position, but the initial value and the way of determining the initial value is not limited thereto.

Subsequently, the game client determines whether it has detected a signal corresponding to a player's operation for changing the posture of the player character; specifically, whether it has detected an option signal OP2 (SD2). In a case in which the result of the determination is "NO", the determination is repeated until the signal is output. In a case in which the result of the determination is "YES", the posture information is updated based on the signal (SD3). The routine then returns to Step SD2. In the update, in a case in which the posture information of the player character indicates a standing position, the posture information is updated so as to indicate a sitting position, and in a case in which the posture information shows a sitting position, the posture information is updated so as to indicate a standing position.

5-4-5. Relationship Between Virtual Space and Screen

Description will now be given of the relationship between a virtual space and the screen before descriptions are given of other processes.

An image of a game displayed on the screen is obtained by perspective projection of an object in a virtual space onto a projection plane of a viewpoint coordinate system. The arrangement in a virtual space of the projection plane is determined by the position and the direction of a viewpoint of a player character. Because the position of the player character's viewpoint is obtained based on the position, posture, and height (or sitting height) of the player character, the arrangement of the projection plane is settled once the position, posture and height (or sitting height) of the player character are determined.

The projection plane is rectangular, and the aspect ratio of the projection plane is the same as that of the screen. The projection plane is positioned so that the central point thereof intersects at a right angle with a line extending from the position of the viewpoint of the player character to the direction in which the character is facing, and so that the distance between the intersection and the viewpoint position is a predetermined distance, and that one side of the projection plane corresponding to a vertical side of the screen is in parallel to a line connecting the position of the player character and the position of the viewpoint. The predetermined distance is determined so that when a character holds the gun unit with its arm extending forward the viewpoint along the visual axis, the mouth of the gun is located at the central point of the projection plane.

Because the virtual space and the screen are in the above-described relationship, the position of an object in the projection plane is determined once the position of the object on the screen is determined, and so is the position of the object in the virtual space. The processes described in the following are performed utilizing such a relationship.

5-4-6. Bullet Trajectory Information Generation and Management Process

Figure 13:
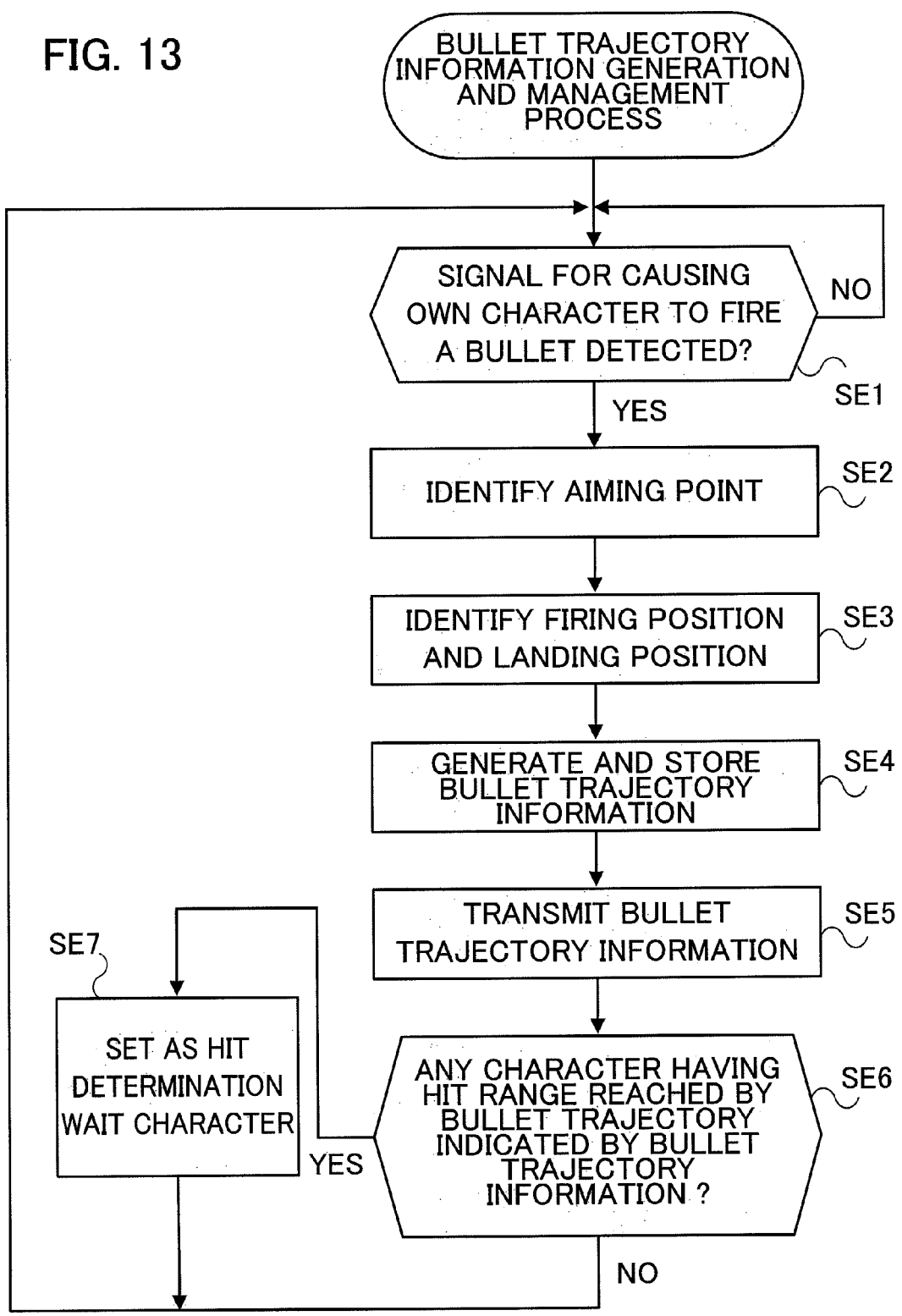
FIG. 13 is a flow chart showing a bullet trajectory information generation and management process of the game device.

FIG. 13 is a flow chart showing a flow of a bullet trajectory information generation and management process. In the bullet trajectory information generation and management process, a game client first determines whether it has detected a signal corresponding to the operation by the player for causing the player character to shoot the gun, i.e., whether it has received trigger signal TG1 (SE1). In a case in which the result of the determination changes to "NO", the determination is repeated until the signal is output. In a case in which the result of the determination changes to "YES", it is determined that a bullet has been fired, and the computation of the bullet trajectory is then performed.

In the bullet trajectory computation, an aiming position is identified for the fired bullet (SE2). The aiming position is identified in the manner described above (see FIG. 4). The firing position and the landing position are then identified (SE3). The firing position is a position at which a bullet was fired in the virtual space and is the central point of the projection plane. The latest arrangement in the projection plane is obtained in an image generation process described later. In this step, the central point of the projection plane is obtained based on the latest arrangement of the projection plane obtained in the image generation process. The landing position is a location to which a bullet reaches in the virtual space, and the landing position is obtained based on the arrangement of the projection plane and the aiming point.

Subsequently, a bullet trajectory information set is generated based on the firing position and the landing position, for storage in RAM 513 as the bullet trajectory information set of the player character (SE4), thereby ending the bullet trajectory computation. The generated bullet trajectory information set shows the trajectory of a bullet starting from the firing position and going straight forward to pass the landing position. The form of expression of the bullet trajectory information set is arbitrary and may be, for example, a function having, as an argument, a variable such as elapsed time that passes every second.

The game client then transmits the generated trajectory information set to the echo server (game device A1) (SE5) and determines whether there is any character having a hit range which the bullet trajectory designated by the bullet trajectory information set reaches (SE6). The hit range is a predetermined range with the position of the character at the center and is determined based on the position information of the opponent character. In a case in which the result of the determination is "NO", that is, the bullet trajectory reaches the hit range of no character, the process returns to Step SE1. On the other hand, if it is determined to be "YES", i.e., if there is a character having the hit range which the bullet trajectory reaches, the character is identified as being a hit determination wait character (SE7). Specifically, the game client writes, in RAM 513, pending position information in association with the position information of the character. The pending position information is information showing another position (hereinafter referred to as the "second position"), which is different from the position (hereinafter referred to as the "first position") of the hit determination wait character. The second position is, in a case in which the second position is the central point of the hit range, the position at which the bullet trajectory never crosses the hit range (i.e., the position that is not hit by a bullet) and also is the closest to the first position. The routine then returns to Step SE1.

The hit determination wait character is displayed as an image that does not clearly show whether the bullet has hit the character (hereinafter referred to as an "uncertainty image") from the time the bullet is fired until it is determined whether the bullet has actually hit the character. The uncertainty image is an image based on which the player of the character which has fired the bullet is unable to determine the present state of the character by looking at the hit determination wait character and is, for example "swinging"; "blinking", "defocused", "decolored (grayed out)", etc. In the present embodiment, description will be given by taking the "swinging" type as an example from among the above examples of the uncertainty image. Although detailed description will be given later in the image generation process, a swing process of the hit determination wait character is started when a bullet reaches a predetermined range (a swing start range) after the bullet is fired. The character is displayed as an uncertainty character (a swinging image) until it is determined whether the bullet has hit the character. It should be noted, in Step SE7, a character having a hit range which the bullet trajectory reaches is set as a hit determination wait character, but the display of the uncertainty image (a swing process) is not started.

The bullet trajectory information set transmitted in Step SE5 is received by the echo server and is then transmitted as a game information set along with the communication address of the transmitter game device 5 to all the game clients belonging to the same group (game devices A1, A2, B1, and B2). The game information set is received by each game client. Each opponent game client stores in RAM 513 the bullet trajectory information set contained in the received game information set as the bullet trajectory information set of a character belonging to the game device 5 identified by the communication address contained in the game information set.

Alternatively, in Step SE6 described above, a character having the hit range which the bullet trajectory designated by the bullet trajectory information reaches can be immediately determined as a hit determined character, and an image (e.g., an image of a character falling over) can be displayed on the screen. However, the hit determination process (described later) for determining whether the bullet has hit the opponent is performed by an opponent (i.e., hit) game client that has received the bullet trajectory information at a timing later than the firing of the bullet (after time has elapsed at least including communication delay for the bullet trajectory information set to reach the opponent game client via the echo server). The outcome is that a result of a hit determination at the attacked game client might contradict the result of the determination of Step SE6 at the shooter game client. For this reason, in the present embodiment, the result of the determination in Step SE6 is not regarded as an assured determination result. That is, the shooter game client withholds the determination until a result of the hit determination process at the hit game client is obtained by displaying an uncertainty image such that the player cannot readily determine from the displayed image whether the bullet has hit the character.

5-4-7. Hit Determination Process

Figure 14:
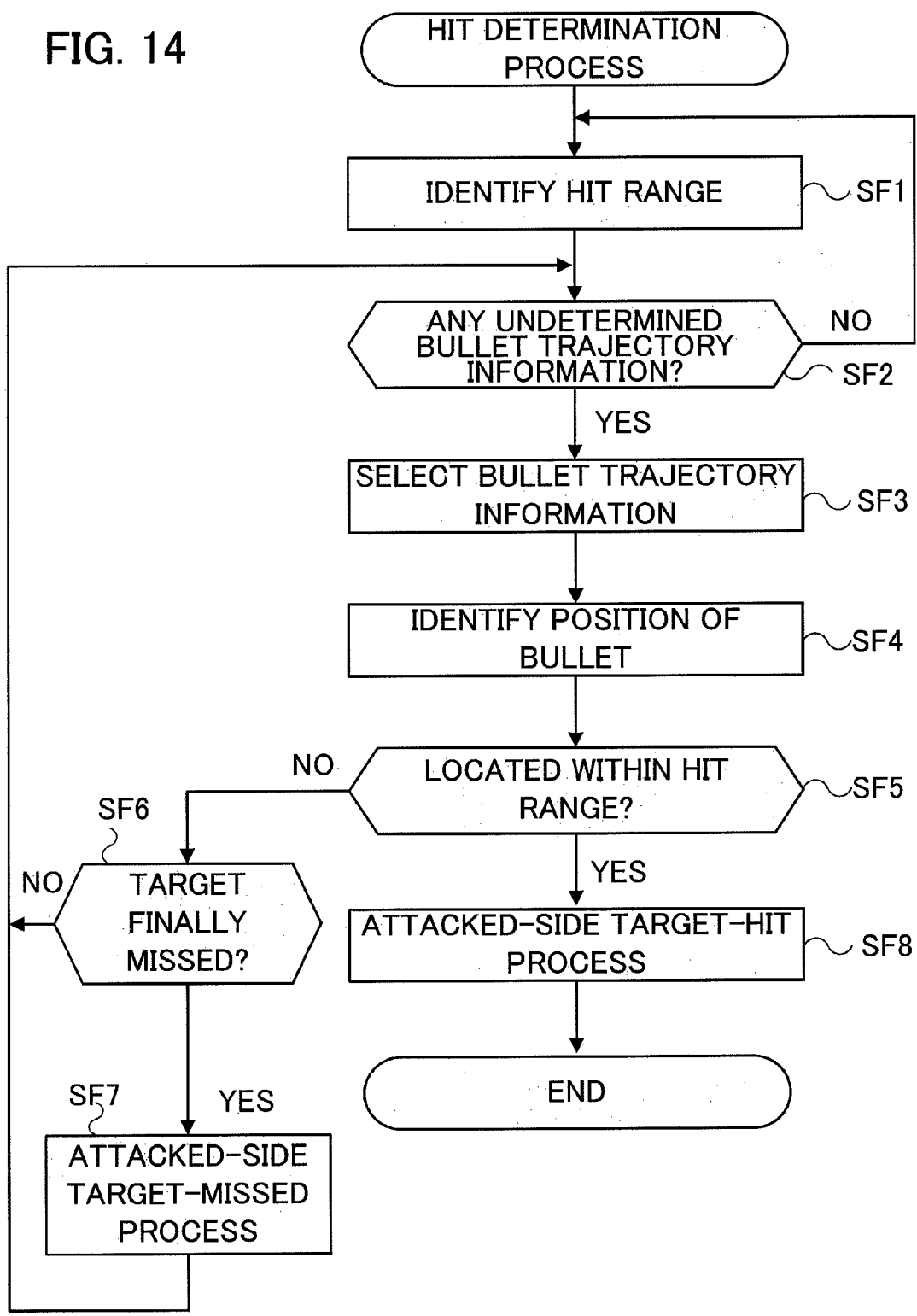
FIG. 14 is a flow chart showing a hit determination process of the game device.

FIG. 14 is a flow chart showing a flow of a hit determination process. In the hit determination process, the hit range is first identified by using the position information of a player character (SF7). The hit range is a predetermined range having the position of the player character at the center and is a reference for the hit determination. Subsequently, it is determined whether there is stored in RAM 513 a bullet trajectory information set (a bullet trajectory information set of a bullet that is fired by an opponent character) that is not yet examined since the hit range was identified most recently (SF2). In a case in which the result of the determination is "NO", the routine proceeds to Step SF1.

In a case in which the result of the determination changes to "YES", one of undetermined bullet trajectory information sets is selected (SF3), the position of a bullet is identified by using the bullet trajectory information set (SF4), and it is determined whether the landing position of the bullet is within the hit range (SF5). In a case in which the result of the determination is "NO", it is then determined whether it is confirmed that the bullet does not hit the player character (SF6). This is determined for example by checking whether the distance between the position of the player character and that of the bullet is increasing.

In a case in which the result of the determination changes to "NO", i.e., it is not confirmed that the bullet does not hit the character, the routine returns to Step SF2. In a case in which the result of the determination changes to "YES", an attacked-side target-missed process at the hit game client is performed, the process being performed when the bullet missed the player character (SF7), and the routine returns to Step SF2. In the attacked-side target-missed process, the game client transmits, to the echo server (game device A1), result information indicating that the bullet missed the player character and then deletes the bullet trajectory information set from RAM 513.

In a case in which the result of the determination of Step SF5 changes to "YES", an attacked side target-hit process is performed, the process being performed in a case in which the player character is hit (SF8). In the attacked side target-hit process, the game client turns a hit flag ON and transmits, to the echo server (game device A1), result information (the bullet trajectory information set and the hit flag) indicating that the bullet shot by the opponent character in association with the bullet trajectory information set has hit the player character. The game client then deletes the bullet trajectory information set from RAM 513.

The result information transmitted in the hit determination process is received by the echo server and is transmitted as a game information set to all the game clients belonging to the same group (game device A1, A2, B1, and B2) along with the communication address of the transmitter game device. All the bullet trajectory information sets stored in RAM 513 are deleted after a predetermined time elapses from the time each bullet trajectory information set was written, so as to avoid a bullet trajectory information set of, for example, a bullet shot toward the sky of the virtual space from remaining therein forever.

5-4-8. Image Generation Process

Figure 15:
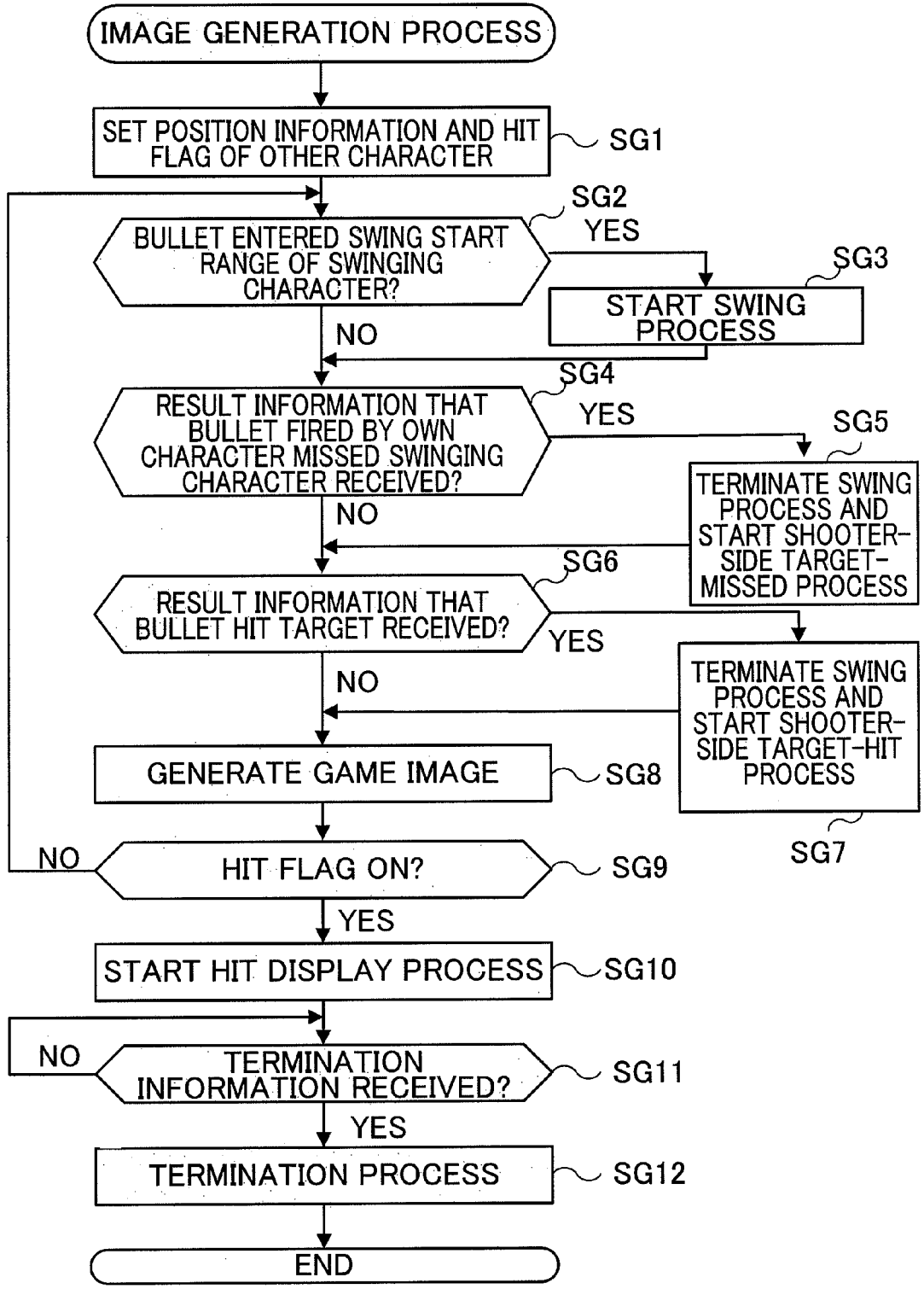
FIG. 15 is a flow chart showing an image generation process of the game device.

FIG. 15 is a flow chart showing a flow of an image generation process for generating an image of a game displayed on the screen. In the image generation process, the game client first sets initial values of the position information and the hit flag of each opponent character (SG1). The initial value of the hit flag is OFF, and the initial values of the position information of each opponent character is determined so as not to contradict the initial value of the position information of a player character at each game device 5.

The game client subsequently determines whether a bullet hit by the player character has entered within a swing start range of a hit determination wait character (SG2). The swing start range is a predetermined range of the virtual space that is used as a reference in deciding whether to start a swing process for swinging a character in the virtual space, with the position of the character being at the center of the range; and the hit range is included in the swing start range. In a case in which the result of the determination is "NO", the routine proceeds to Step SG4. On the other hand, in a case in which the result of the determination is "YES", the game client starts the swing process (SG3) and then proceeds to Step SG4.

Figure 16:
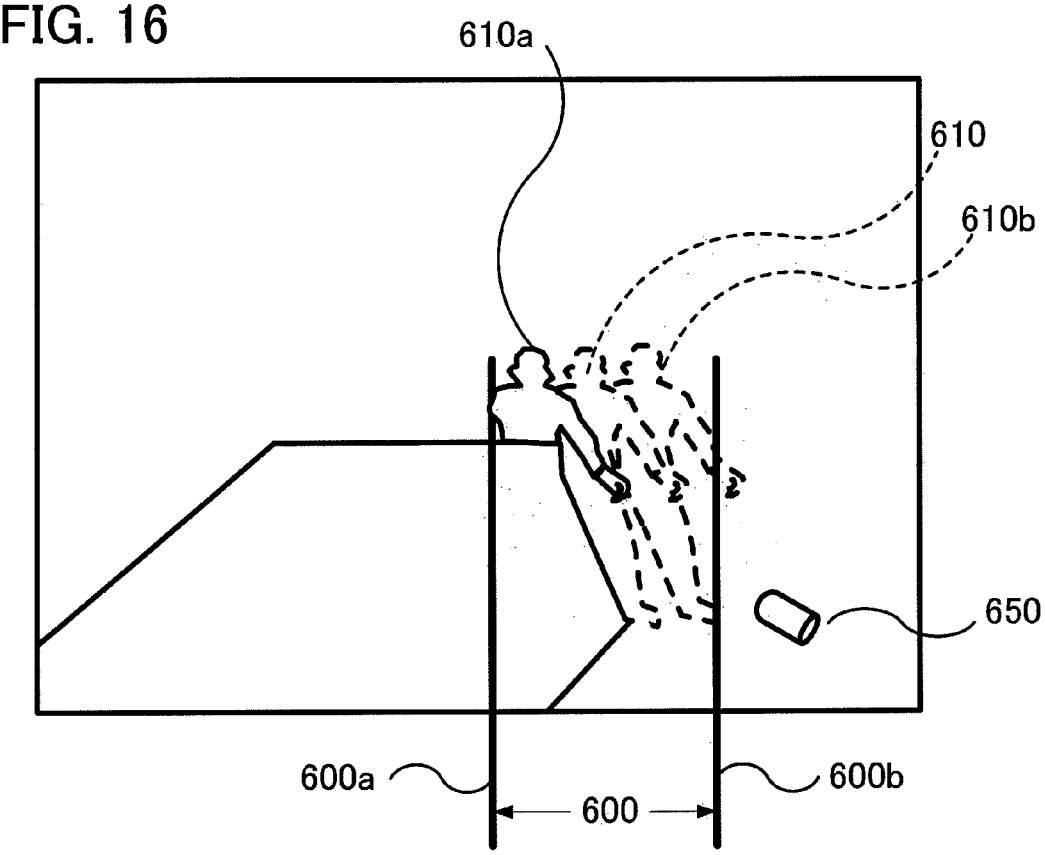
FIG. 16 is a diagram showing an example screen of the game device.

FIG. 16 is a diagram showing an example of an image in which a hit determination wait character 610 is swinging in the swing process. In the swing process, as shown in FIG. 16, the arrangement of the character in the image generation process is controlled so that the character swings between the position (the first position 610*a*) indicated by the position information of the character and the position (the second position 610*b*) indicated by the uncertain position information of the character.

In Step SG4, in the swing process, the game client determines whether it has received a result information set indicating that the bullet fired by the player character missed the hit determination wait character. Specifically, the client refers to the hit flag of the information which contains the bullet trajectory information set of the game client from among one or more result information sets. It is determined to be "YES" in a case in which the hit flag is OFF; and it is determined to be "NO" otherwise (i.e., in a case in which result information is not received or, even if it is received, in a case in which the hit flag is ON). A result information set can be passed as a game information set via the echo server from a game client, the player character of which is the hit determination wait character. Where it is determined to be "NO", the routine proceeds to Step SG6. Where it is determined to be "YES" the swing process is terminated. The game client then starts a shooter-side target-missed process that is a process performed when a bullet did not hit the opponent character (SG5), and the routine proceeds to Step SG6 thereafter.

Figure 17:
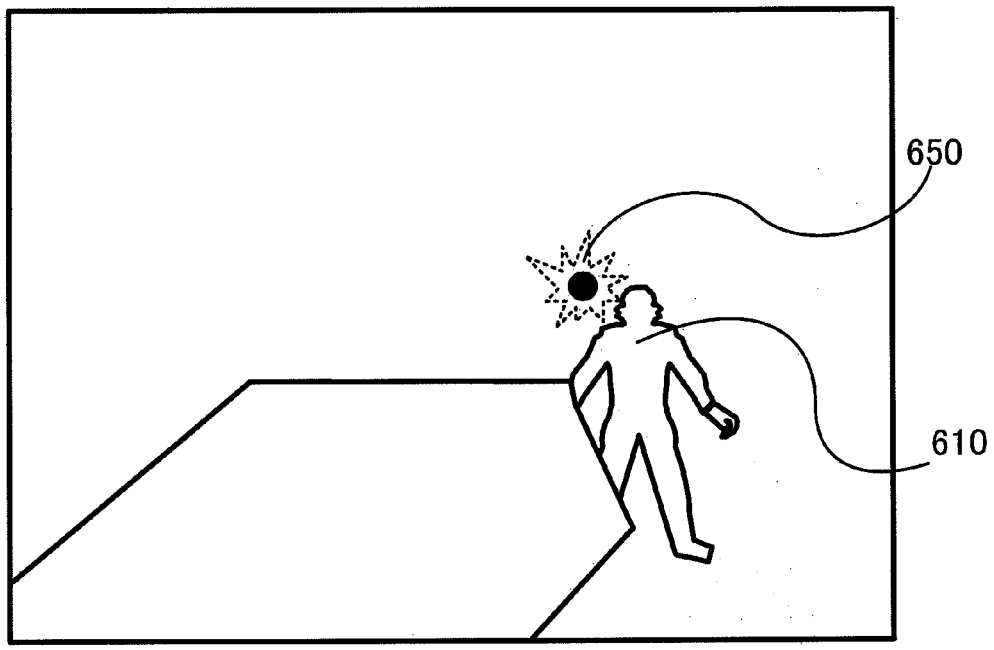
FIG. 17 is a diagram showing an example screen of the game device.

FIG. 17 is a diagram showing an example of an image displayed in a case in which the bullet fired by the player character missed the hit determination wait character. As shown in FIG. 17, the bullet 650 missed the hit determination wait character 610 and has passed above the head of the character. In the shooter-side target-missed process, the arrangement performed in the image generation process of the character is controlled in such a way as shown as an example in FIG. 17.

In Step SG6, the game client determines whether it has received a result information set indicating that the bullet has hit the character. Specifically, by referring to the hit flag of the result information set which contains the bullet trajectory information of the game client from among one or more result information sets, the game client determines it to be "YES" in a case in which the flag is ON and determines it to be "NO" otherwise (i.e., in a case in which a result information set is not received or, even if it is received, the hit flag is OFF). The result information set can be passed as a game information set via the echo server from a game client, the player character of which is the hit determination wait character. Where it is determined to be "NO", the routine proceeds to Step SG8. Where it is determined to be "YES", the swing process is terminated. The game client then starts a shooter-side target-hit process that is a process performed when a bullet hit the opponent character (SG7), and the routine proceeds to Step SG8 thereafter.

In the shooter-side target-hit process, the arrangement performed in the image generation process of the character is controlled so that the character hit by the bullet falls over. Additionally, in the shooter-side target-hit process, in a case in which all the opponent characters fall over, the game client displays, on a screen, an image showing that the player character is the only survivor. The game client then transmits termination information indicating that the game will be terminated and shuts down the game client (and echo server). The game process and relay process are thus ended.

In Step SG8, an image of a game to be displayed on a screen is generated. In this generation process, at least one opponent character and the bullet are arranged in a virtual space based on position information, posture information, and facing direction information of a player character and position information of the at least one opponent character, the bullet trajectory information, and map information. In this arrangement, the control for the swing process is given a higher priority. The position information, posture information, facing direction information, and height (or sitting height) of the player character are used to identify the arrangement of the projection plane described above, so that a game image is obtained by prospectively projecting objects in the virtual space onto the projection-plane.

The image obtained in Step SG8 is displayed on the screen of display device 52. In a case in which there is an opponent character for which the arrangement is controlled in the swing process, an image in which the opponent character is swinging (an image such as shown in FIG. 16) is displayed on the screen. In this example, before bullet 650 reaches the opponent, an image is displayed in which the opponent character 610 swings within a swing range (between the left boundary 600*a* and the right boundary 600*b*). Because it is difficult to determine from the swinging image whether bullet 650 has hit the opponent character 610, the player does not prejudge the result. Without prejudgment, no contradiction arises between what is prejudged and a result of the determination. Therefore, even in a case in which it turns out afterwards that the bullet 650 hit or did not hit the opponent character 610, the player is much less likely to feel a sense of discomfort compared to a case in which there is a contradiction between what is prejudged and a result of the determination.

Subsequently, the game client determines whether the hit flag with respect to the player character is ON (SG9). In a case in which the result of the determination is "NO", the routine returns to Step SG2. In a case in which the result of the determination is "YES", the game client starts a shot image display process that is a process performed when the player character is shot (SG10), and the routine then proceeds to Step SG11. In the shot image display process, an image showing that the player character has been hit (e.g., an image corresponding to a view of the player character when the character is lying down, or an image that is red throughout the screen) is displayed over a predetermined period.

In Step SG11, the game client determines whether termination information is received. In a case in which the result of the determination is "NO", the routine returns to Step SG11. That is, in a case in which the player character is shot, the game client waits until it receives the termination information. In a case in which the result of the determination of Step SG11 is "YES", the termination process of shutting down the game client (and the echo server) is performed (SG12). The game process and the relay process are thus ended.

6. Summary

As has been described above, in game system 100, a game client generates a bullet trajectory information set in a case in which the player operates gun unit 56 to fire a bullet from a player character to an opponent character to transmit the bullet trajectory information set to the echo server. Furthermore, in a case in which a bullet trajectory information set is received from the echo server, a game client generates information showing a result of determination as to whether the bullet has hit the player character based on the position information of the player character and the received bullet trajectory information. Additionally, in a case in which gun unit 56 is operated so as to fire a gun towards an opponent character, an image that obscures whether the opponent character is hit, specifically, an image in which a character is swinging, is displayed on display device 52 during a period from the time the signal of the operation of the gun unit is detected until result information is received from the opponent game device 5, i.e., the period from the time the bullet enters the swing start range of the opponent character until the game client receives result information from the opponent game device 5.

Thus, according to the present embodiment, a sense of discomfort (or contradiction) that is felt by the player in a case in which the bullet did not actually hit the target, although it appeared that the target was hit on the screen, or a sense of discomfort (or contradiction) that is felt by the player in a case in which the bullet actually hit the target, although it did not appear that the target was hit can be reduced (or avoided), the sense of discomfort (or contradiction) having arisen due to communication delay.

Moreover, according to the present embodiment, information exchanged between plural game devices 5 based on a character's movement is transmitted only in a case in which there is a transfer from one reference point to another. Therefore, the amount of communication can be considerably reduced when compared with a case in which position information is transmitted corresponding to every tiny move a character makes. Furthermore, because only the identifier of a reference point is transmitted, the amount of communication is further reduced.

Also, in the present embodiment, reference points are spaced sufficiently apart from one another. Therefore, a certain amount of the distance can be easily maintained between the player character and the opponent character. In this case, the probability can be reduced of giving a sense of discomfort to players by an opponent character swinging and being displayed, with the character being enlarged to fill the entire screen. Another way of reducing this probability is to change a process depending on a distance between the player character and the opponent character. That is, for example, not performing the swing process in a case in which the distance between the player character and the correspondent character is equal to or smaller than the predetermined distance.

Furthermore, as described above, in game system 100, the game client generates a bullet trajectory information set when the player operates gun unit 56 to cause a player character to fire a gun at an opponent character to transmit the bullet trajectory information set to the echo server. In a case in which the bullet trajectory information is received from the echo server, the game client generates information showing a result of determination as to whether the bullet has hit the player character based on position information of the player character and the received bullet trajectory information. In a case in which game device 5 is designated as an echo server, a game information set generated at the game device 5 and a game information set received from at least one opponent game device are transmitted to at least one opponent game device 5 in an order in which game information sets are received.

Thus, according to the present embodiment, because the chronological order of game information sets is maintained by the echo server, contradictions in the progress of the game that arise due to communication delay can be avoided. Also, the move of a player character is immediately reflected by the screen of a game device 5 to which the player character belongs, time required for an operation to be reflected by an image can be considerably shortened as compared with a case in which all processes are executed in the server device.

Additionally, various determinations relating to the progress of a game such as a hit determination are performed by a game client. Therefore, when compared with a case in which various determinations relating to the progress of a game are performed by a relay device, the burden placed on a device that functions as an echo server can be reduced. This also means that a system can be readily built in which a game can be seamlessly, although with some constraints, continued at each game device, in a case in which communication is suddenly disconnected when a game is being played by communicating with at least one opponent game device.

Furthermore, in a master-slave type game system in which there is no fixed game device that functions as a master, a program for a master and a program for a slave must be created as programs for a game device. On the other hand, in the present embodiment, a program to be created as a program of a game device is the program P only. That is, game system 100 can be readily developed.

Furthermore, preferably, in the above game system 100, the processor 511 performs a process of causing an image to be displayed on display unit 52, the image corresponding to a move of the player character based only on a game information set generated by the processor 511 of this game device 5; a process of causing an image to be displayed on display unit 52, the image corresponding to a move of the opponent game character, based only on a game information set obtained from the opponent game device 5; and a process of causing an image to be displayed on display unit 52, the image corresponding to a move of the player character based on a game information set generated by the processor 511 of this game device 5 and a game information set obtained from the opponent game device 5. In the present invention, "an image corresponding to a move of the player character only based on a game information set generated in the processor of the game device" is, for example, an image in which a view is changed as the player character moves. "An image corresponding to a move of the player character based on a game information set generated by the processor of the game device and a game information set obtained from the opponent game device" includes an image in which a bullet shot by the player character hits the opponent character and an image in which a bullet shot by the opponent character hits the player character. Thus, an image having no relationship to an operation of another game device is generated at a single game device for display, and an image relating to an operation of another game device is generated in association with an operation of another game device. Therefore, the processing load of the processor is reduced, and a response time is reduced from a time at which an operation of a character takes place until an image corresponding thereto is displayed.

7. Modifications

In the above embodiment, the communication address of game device 5 is used as an identifier of game device 5, but this may be modified so that, with use of a card carried by a player in which a unique ID is written, a game device may read the ID from the card to use the ID as an identifier of the game device.

Furthermore, in the above embodiment, lobby server 1 and entry list EL are used for grouping game devices 5, but this is not limited thereto. For example, a game system may be modified so that a predetermined number of game devices that are grouped in advance play a game.

Furthermore, a move of a character and a means for inputting an operation for moving the character are not limited to those that have been described above. For example, a button for making a character jump may be provided on a game device so that the player character is caused to jump when the button is depressed. Also, an acceleration sensor may be provided so as to detect the momentum of a player and have the character move depending on detected momentum.

In the present embodiment, a game device 5 functions as an echo server, but this may be modified so that a device other than a game device may function as an echo server. For example, router 4 in the game venue A may function as an echo server for a group in which a game device 5 in the game venue A participates. Furthermore, plural echo servers may be activated at router 4. For example, in a case in which game devices A1 and B1 participate in the first group and game devices A2 and B2 participate in the second group, the router 4 of the shop venue A is caused to function as an echo server for the first group and also as an echo server of the second group.

The invention claimed is:

1. A game system comprising plural game devices and a server device, the game system enabling a game to be executed among a predetermined number of game devices grouped from among said plural game devices, plural players respectively operating plural characters in the game that are set in a virtual space, said server device comprising:
   a receiver that receives a participation request from at least one of said plural game devices;
   a grouper that forms a group of the predetermined number of game devices that will participate in a game, the predetermined number of game devices including a player game device and at least one opponent game device; and
   a specifier that specifies one of the predetermined number of game devices as a specific game device, and said game device comprising:
   a communicator that performs a communication;
   a display that displays an image associated with the game;
   an operation signal outputter that outputs an operation signal in response to an operation performed by a player of said game device;
   a processor that, in a case in which said game device is said player game device of the predetermined number of grouped game devices, generates, upon an operation signal for moving a player character operated by a player of said player game device being output from the operation signal outputter, a game information set specifying a move of the player character based on the operation signal, and that causes images to be displayed on the display, one of the images corresponding to the move of the player character in the virtual space and another of the images corresponding to a move of an opponent character in the virtual space operated by a player of the opponent game device, the images having been generated based on the generated game information set of the player character and a stored game information set; and
   a transmitter, in a case in which said game device is said player game device but is not the specific game device, that stores a game information set obtained from the specific game device via the communicator and transmits the game information set generated by the processor to the specific game device via the communicator, whereas in a case in which said game device is said player game device and is the specific game device, that stores and transmits, to the opponent game device via the communicator, game information sets obtained from the opponent game device in an order in which the game information sets were obtained from the communicator and that transmits the game information set generated by the processor of said player game device to the opponent game device;
   wherein, in a case in which said game device is said player game device and is the specific game device, the transmitter of said player game device transmits the game information sets obtained from the opponent game devices in an order in which the game information sets were obtained from the communicator, the game information sets being transmitted to the opponent game devices excluding respective opponent game devices that sent the respective game information sets.

2. A game system according to claim 1, wherein the number of the at least one opponent game device is at least two.

3. A game system according to claim 1,
   the processor comprising:
   a position information manager that generates and manages position information showing a position of the player character in the virtual space based on the operation signal;
   a storage device that stores plural reference positions that are set in the virtual space and designation information designating each of the plural reference positions;
   a reference position shifter that, upon a position of the player character exceeding a predetermined range having one of the reference positions as its center, shifts the position of the player character to a contiguous reference position, and obtains, by referring to the storage device, specific information corresponding to the reference position after the shift, the specific information then being supplied to the transmitter; and a display controller that executes a process of generating position information specifying a position of the player character and displaying on the display an image viewed from a position specified by the position information and a process of, upon receiving via the communicator the designation information of the opponent character as the game information set, displaying on the display, by referring to the storage device, an image of the opponent game character located at the reference position designated by the designation information of the opponent character.

4. A game device for use in a game system having a server device and plural game devices including said game device, the game system enabling a game to be executed among a predetermined number of game devices grouped from among said plural game devices, plural players respectively operating plural characters in the game that are set in a virtual space, said game device comprising:

a communicator that performs a communication with the server device and with each of said plural game devices of the game system, the server device for receiving a participation request from at least one of said plural game devices, forming a group of a predetermined number of game devices that will participate in a game, and specifying one of the predetermined number of game devices as a specific game device, the predetermined number of game devices including a player game device and at least one opponent game device, a display that displays an image associated with the game;

an operation signal outputter that outputs an operation signal in response to an operation performed by a player of said game device;

a processor that, in a case in which said game device is said player game device of the predetermined number of grouped game devices, generates, upon an operation signal for moving a player character operated by a player of said player game device being output from the operation signal outputter, a game information set specifying a move of the player character based on the operation signal, and that causes images to be displayed on the display, one of the images corresponding to the move of the player character in the virtual space and another of the images corresponding to a move of an opponent character in the virtual space operated by a player of the opponent game device, the images having been generated based on the generated game information set of the player character and a stored game information set; and a transmitter, in a case in which said game device is said player game device but is not the specific game device, that stores a game information set obtained from the specific game device via the communicator and transmits the game information set generated by the processor to the specific game device via the communicator, whereas, in a case in which said game device is said player game device and is the specific game device, that stores and transmits, to the opponent game device via the communicator, game information sets obtained from the opponent game device in an order in which the game information sets were obtained from the communicator and that transmits the game information set generated by the processor of said player game device to the opponent game device;

wherein, in a case in which said game device is said player game device and is the specific game device, the transmitter of said player game device transmits the game information sets obtained from the opponent game devices in an order in which the game information sets were obtained from the communicator, the game information sets being transmitted to the opponent game devices excluding respective opponent game devices that sent the respective game information sets.

5. A non-transitory computer readable medium having stored thereon a program for running on a computer of a game device of a game system including plural game devices and a server device, the game system enabling a game to be executed among a predetermined number of game devices grouped from among said plural game devices, plural players respectively operating plural characters in the game that are set in a virtual space, with said game device having a communicator that performs a communication, a display that displays an image associated with the game, and an operation signal outputter that outputs an operation signal in response to an operation performed by a player of said game device, the program, when run on the computer, at least including computer readable instructions for performing the steps of:

transmitting a participation request for a game to said server device which, upon receiving the participation request from at least one of said plural game devices, forms a group of the predetermined number of game devices that will participate in the game and that specifies one of the predetermined number of game devices as a specific game device, the predetermined number of game devices including a player game device and at least one opponent game device;

in a case in which said game device is said player game device of the predetermined number of grouped game devices, generating, upon an operation signal for moving a player character operated by a player of said player game device being output from the operation signal outputter, a game information set specifying a move of the player character based on the operation signal, and causing images to be displayed on the display, one of the images corresponding to the move of the player character in the virtual space and another of the images corresponding to a move of an opponent character in the virtual space operated by a player of the opponent game device, the images having been generated based on the generated game information set of the player character and a stored game information set; and in a case in which said game device is said player game device but is not the specific game device, storing a game information set obtained from the specific game device via the communicator and transmitting the game information set generated by the processor to the specific game device via the communicator, whereas, in a case in which said game device is said player game device and is the specific game device, storing and transmitting, to the opponent game device via the communicator, game information sets obtained from the opponent game device in an order in which the game information sets were obtained from the communicator and transmitting the game information set generated by the processor of said player game device to the opponent game device;

wherein, in a case in which said game device is said player game device and is the specific game device, the transmitter of said player game device transmits the game information sets obtained from the opponent game devices in an order in which the game information sets were obtained from the communicator, the game information sets being transmitted to the opponent game devices excluding respective opponent game devices that sent the respective game information sets.

6. A method of controlling a game system having plural game devices and a server device, the game system enabling a game to be executed among a predetermined number of game devices grouped from among said plural game devices, plural players respectively operating plural characters in the game that are set in a virtual space, with each of said plural game devices having a communicator that performs a communication, a display that displays that displays an image associated with the game, and an operation signal outputter that outputs an operation signal in response to an operation performed by a player of said game device;

the method being performed by said game device and comprising:

transmitting a participation request for a game to said server device which, upon receiving the participation request from at least one of said plural game devices, forms a group of the predetermined number of game devices that will participate in the game and that specifies one of the predetermined number of game devices as a specific game device, the predetermined number of game devices including a player game device and at least one opponent game device;

in a case in which said game device is said player game device of the predetermined number of grouped game devices, generating, upon an operation signal for moving a player character operated by a player of said player game device being output from the operation signal outputter, a game information set specifying a move of the player character based on the operation signal, and causing images to be displayed on the display, one of the images corresponding to the move of the player character in the virtual space and another of the images corresponding to a move of an opponent character in the virtual space operated by a player of the opponent game device, the images having been generated based on the generated game information set of the player character and a stored game information set; and in a case in which said game device is said player game device but is not the specific game device, storing a game information set obtained from the specific game device via the communicator and transmitting the game information set generated by the processor to the specific game device via the communicator, whereas, in a case in which said game device is said player game device and is the specific game device, storing and transmitting, to the opponent game device via the communicator, game information sets obtained from the opponent game device in an order in which the game information sets were obtained from the communicator and transmitting the game information set generated by the processor of said player game device to the opponent game device;

wherein, in a case in which said game device is said player game device and is the specific game device, the transmitter of said player game device transmits the game information sets obtained from the opponent game devices in an order in which the game information sets were obtained from the communicator, the game information sets being transmitted to the opponent game devices excluding respective opponent game devices that sent the respective game information sets.

\* \* \* \* \*